US011678616B2

(12) United States Patent
Kim et al.

(10) Patent No.: US 11,678,616 B2
(45) Date of Patent: Jun. 20, 2023

(54) PLANT CULTIVATION SYSTEM USING TROLLEY CONVEYOR

(71) Applicant: KOREA WHEEL CORPORATION, Boryeong-si (KR)

(72) Inventors: Jeong Yoon Kim, Bucheon-si (KR); Hun Choe, Boryeong-si (KR)

(73) Assignee: KOREA WHEEL CORPORATION, Boryeong-si (KR)

( * ) Notice: Subject to any disclaimer, the term of this patent is extended or adjusted under 35 U.S.C. 154(b) by 144 days.

(21) Appl. No.: 17/105,227

(22) Filed: Nov. 25, 2020

(65) Prior Publication Data
US 2021/0127596 A1 May 6, 2021

Related U.S. Application Data

(63) Continuation of application No. PCT/KR2019/008581, filed on Jul. 11, 2019.

(30) Foreign Application Priority Data

Sep. 12, 2018 (KR) .................. 10-2018-0109014
Jun. 7, 2019 (KR) .................. 10-2019-0067522

(51) Int. Cl.
*A01G 9/26* (2006.01)
*A01G 5/00* (2006.01)
(Continued)

(52) U.S. Cl.
CPC .............. *A01G 9/26* (2013.01); *A01D 46/00* (2013.01); *A01G 5/00* (2013.01); *A01G 9/241* (2013.01);
(Continued)

(58) Field of Classification Search
CPC . A01G 9/02; A01G 9/00; A01G 9/241; A01G 9/26; A01G 9/247; A01G 31/045;
(Continued)

(56) References Cited

U.S. PATENT DOCUMENTS 2,710,319 A 6/1955 Bush
3,074,356 A 1/1963 Parker et al.
(Continued)

FOREIGN PATENT DOCUMENTS

CN 102368900 A * 3/2012 ............. A01G 9/246
EP 3850941 A1 7/2021
(Continued)

OTHER PUBLICATIONS

International Search Report, PCT/KR2019/008581, dated Oct. 18, 2019 [4 pages].
(Continued)

*Primary Examiner* — Peter M Poon
*Assistant Examiner* — Carly W. Lynch
(74) *Attorney, Agent, or Firm* — R. Reams Goodloe, Jr.

(57) ABSTRACT

A plant cultivation system. The system utilizes a trolley conveyor for transport of plants in plant containers. The trolley conveyor uses straight runs of track connected by curved track portions. The straight runs of track of the trolley conveyor are spaced closely together. The trolley conveyor is used to move plant containers to a workshop for planting, fertilization, watering, cultivation, and harvesting of plants or portions thereof, and for packaging of plants or portions thereof for shipment.

19 Claims, 14 Drawing Sheets

(51) Int. Cl.
*A01G 9/24* (2006.01)
*A01D 46/00* (2006.01)
*B65G 17/20* (2006.01)
*B65G 43/08* (2006.01)
*E04B 7/16* (2006.01)
*B65G 35/06* (2006.01)
*B65G 39/20* (2006.01)

(52) U.S. Cl.
CPC .............. *A01G 9/247* (2013.01); *B65G 17/20* (2013.01); *B65G 35/06* (2013.01); *B65G 39/20* (2013.01); *B65G 43/08* (2013.01); *E04B 7/16* (2013.01); *B65G 2203/0266* (2013.01)

(58) Field of Classification Search
CPC .......... A01G 31/042; A01G 9/14; A01G 9/24; A01G 9/143
See application file for complete search history.

(56) References Cited

U.S. PATENT DOCUMENTS

| | | | |
|---|---|---|---|
| 3,589,503 A | 6/1971 | Leach | |
| 3,590,745 A | 7/1971 | Ouska | |
| 3,762,535 A | 10/1973 | Becker et al. | |
| 3,774,548 A | 11/1973 | Borst | |
| 4,170,089 A | 10/1979 | Smrt | |
| 4,598,812 A | 7/1986 | Grube | |
| 4,715,288 A | 12/1987 | Catena | |
| 4,716,839 A | 1/1988 | Catena | |
| 5,074,220 A | 12/1991 | Petersen | |
| 5,199,580 A | 4/1993 | Bankier | |
| 6,122,861 A * | 9/2000 | Kertz | A01G 31/04 47/65 |
| 6,125,991 A | 10/2000 | Veldkamp et al. | |
| 6,386,355 B1 | 5/2002 | Willems | |
| 6,450,326 B1 * | 9/2002 | Hoffmann | B65G 39/20 198/845 |
| D506,160 S | 6/2005 | Lambert | |
| 6,910,425 B2 | 6/2005 | Galpin | |
| 10,017,327 B2 | 7/2018 | Okamura et al. | |
| 10,136,587 B1 | 11/2018 | Johnson | |
| 10,280,005 B2 | 5/2019 | Stauber | |
| 10,550,881 B2 | 2/2020 | Lavigno, IV et al. | |
| 10,676,283 B2 | 6/2020 | Gumbel et al. | |
| 11,046,526 B1 | 6/2021 | Hyvarinen et al. | |
| 2004/0084288 A1 | 5/2004 | Ashida et al. | |
| 2012/0137578 A1 * | 6/2012 | Bradford | A01G 9/143 47/65.5 |
| 2013/0284569 A1 | 10/2013 | Studer | |
| 2015/0173315 A1 * | 6/2015 | Aznar Vidal | A01G 31/02 |
| 2019/0110416 A1 | 4/2019 | Crain | |
| 2019/0335676 A1 * | 11/2019 | Solomon | A01G 31/042 |
| 2021/0127597 A1 | 5/2021 | Choe | |
| 2021/0130102 A1 | 5/2021 | Kim | |
| 2021/0147154 A1 | 5/2021 | Choe | |
| 2022/0046875 A1 | 2/2022 | Clemmer | |
| 2022/0221328 A1 | 7/2022 | Coffin | |

FOREIGN PATENT DOCUMENTS

| | | | |
|---|---|---|---|
| GB | 1076820 A | 7/1967 | |
| JP | H08127411 A * | 5/1996 | ............ B65G 21/22 |
| JP | H10215701 A * | 8/1998 | ........... A01G 31/045 |
| KR | 20020092561 A | 12/2002 | |
| KR | 10-0490674 | 5/2005 | |
| KR | 10-2009-0088668 | 8/2009 | |
| KR | 10-1150368 | 6/2012 | |
| KR | 10-2012-0094769 | 8/2012 | |
| KR | 10-2012-0094769 A | 8/2012 | |
| KR | 10-2012-0125064 | 11/2012 | |
| KR | 10-2012-0125064 A | 11/2012 | |
| KR | 10-1292779 B1 | 8/2013 | |
| KR | 10-2017-0025460 | 3/2017 | |
| KR | 10-2018-0020542 | 2/2018 | |
| KR | 10-2018-0020542 A | 2/2018 | |
| KR | 20180020542 A * | 2/2018 | ............... A01G 9/24 |
| KR | 10-2053997 | 12/2019 | |
| KR | 10-2053997 B1 | 12/2019 | |
| KR | 10-2074300 | 3/2020 | |
| KR | 10-2074300 B1 | 3/2020 | |
| KR | WO 2020/054958 A1 | 3/2020 | |

OTHER PUBLICATIONS

KR20020092561 A (Dec. 12, 2002), Lee Kwan Hee—EPO Espacenet—Bibliograhic data (1 pg) Claims and Description—EPO Espacenet—Patent Translate—Machine English Translation (8pgs).

* cited by examiner

PLANT CULTIVATION SYSTEM USING TROLLEY CONVEYOR

RELATED PATENT APPLICATIONS

This application is a continuation of PCT KR 2019/008581, filed on Jul. 11, 2019, and published as WIPO Publication No. WO 2020/054958 A1 on Mar. 19, 2020, entitled Trolley Conveyor and Plant Cultivation System Using Same. That PCT application claimed priority from Korean Patent Application 10-2018-0109014, filed Sep. 12, 2018, and Korean Patent Application 10-2019-0067522, filed Jun. 7, 2019. The disclosures of each of PCT KR 2019/008581, Korean Patent Application 10-2018-0109014, and Korean Patent Application 10-2019-0067522, are incorporated herein in their entirety by this reference.

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever

TECHNICAL FIELD

This disclosure is directed to systems and methods for indoor crop cultivation in a plant factory, and to apparatus for transport of plants in containers in which the plants are grown between various locations within the plant factory.

BACKGROUND

Increased interest has been seen in recent years in plant cultivation in a continuous and stable plant cultivation environment, such as in greenhouses, in order to avoid the plant cultivation being affected by nature. In other words, there has been an increased interest in the form of plant factories where plants are grown indoors and even shipped, similar to production at factories which produce industrial products. An example of such a plant factory was disclosed in Korean Patent Application Publication No. 10-2017-0025460, published Mar. 8, 2017, with the title *Method of Cultivating Spinach Using Light Quality in a Closed Plant Factory System*. However, since the plant factory described cultivates plants at fixed locations in the factory, plants at specific locations which have poor lighting conditions experience degraded growth, compared to the plants at other locations in the plant factory with good lighting conditions. Presently, the solution to this problem involves the hassle of having to change the position of each plant or plant bed in the factory, which requires the worker to move the plants or plant beds around the factory, often one by one. Additionally, since the worker has to have space to move between the plant beds, there is a limit to the number of plants, usually in plant pots or beds, which can be arranged per unit area, since space for the worker to move when arranging the plant pots or beds is required.

Further, in a conventional greenhouse or plant factory, a lot of manpower is required because workers must spend time fertilizing the plants so that they grow or bear fruit. In addition, if a plant or parts thereof needs to be shipped for sale, the worker must go around the plant factory, picking the plant, or plant leaves, or picking fruit, and then carry out the plant products, such as collected leaves or fruit, to a packaging table, where the products are prepared for shipment. Consequently, in prior art plant factory configurations, a lot of labor is required for handling the plants or plant products.

SOME OBJECTS, ADVANTAGES, AND NOVEL FEATURES

An object of the invention(s) disclosed herein is to solve the above-described problem of the fixed plant location of plants being grown, and eliminate requirements for workers to move plants and plant products around the plant factory, by using a trolley conveyor to move the plant pots and beds. In an embodiment, the pots and beds may be automatically transferred by the trolley conveyor, so that all plant pots and beds are exposed to light under the same conditions.

It is yet another object of the invention(s) disclosed herein to provide a plant cultivation system that allows nutrients to be easily supplied to plants, without the need for individual plant attention by workers.

It is yet another object of the invention(s) disclosed herein to provide a plant cultivation system capable of maximizing the number of plants, i.e. plant pots or beds, per unit area. Since, in an embodiment, all plant pots are automatically moved by a trolley conveyor, space for workers to move about the plant factory can be minimized or eliminated.

Another object of the invention(s) disclosed herein to provide for supply of water and nutrients to a plurality of plants in pots or beds, even while connected to a trolley conveyor by hangers. In an embodiment, all plant ports may be circulated together by the drive mechanism of the trolley conveyor. Thus, water supply, nutrient supply, and modification thereof may be made as appropriate for plant cultivation. Importantly, such a plant cultivation system as described herein can significantly minimize labor requirements for plant cultivation.

Another object of the invention(s) disclosed herein is to provide a plant cultivation system in which plants brought to a worker for picking and packaging, so that the worker may wait in place, and the plants (or portions thereof to be removed) to be shipped or packaged are supplied to the workers location, thereby reducing the working time, and labor required for plant packaging.

Another object of the invention(s) disclosed herein is to provide a plant cultivation system capable of efficient transport of plants in the factory, while minimizing noise generation and minimizing production of foreign matter such as dust and dirt, as plants in various units in a plant factory are moved along between locations, such as when being repositioned using the chain portions of a trolley conveyor.

Another object of the invention(s) disclosed herein is to provide a plant cultivation system using a trolley conveyor that prevents the lubricating oil supplied to the chain from contaminating plants when the hanger unit suspended from the trolley conveyor is moved along by the chain portion of the trolley conveyor.

The above objects and various advantages of the invention(s) as disclosed herein will become more apparent from the description provided and details of various embodiments, as will be understood by those skilled in the art.

SUMMARY

A factory is provided for cultivation of plants. The plant factory includes a trolley conveyor system that has a stationary portion provided by a slotted tubular track in which a movable portion is provided. The movable portion includes a plurality of first conveyor chain links and second conveyor chain links are provided. The first conveyor chain link includes a vertical roller support, and the second conveyor chain link incudes a horizontal roller support. A plurality of hangers are provided, supported for movement with the movable portion of the trolley conveyor. The hangers extend outward through a slot portion of the slotted tubular track, for movement with respect thereto, and extend downward to a plant container support on which plants being cultivated are placed in containers. The trolley conveyor may be configured as an endless track having multiple serpentine sections spaced only so far apart as to provide adequate clearance for the plant containers of the plants being cultivated. The plant factory may include water supply sections having a plurality of spray nozzles for watering plants. The plant factory may include nutrient supply stations which also include a plurality of spray nozzles for providing dissolved nutrients to plants via spray. Finally, a fertilization station may be provided, wherein air jets are utilized to transfer pollen between plants. The plant maximizes the use of growing space, since workers are not required to walk around to place and retrieve containers in which plants are grown. Rather, the trolley conveyor system brings plant containers to a work station for handling, such as packaging for shipment. And, workers do not waste time placing and retrieving plant containers. Instead, the plant containers are brought to the worker, resulting in increased productivity of the plant factory.

BRIEF DESCRIPTION OF THE DRAWING

The present invention(s) are described herein by way of exemplary embodiments, using for illustration the accompanying drawing in which like reference numerals denote like elements in the various figures of the drawing, and in which.

Figure 1:
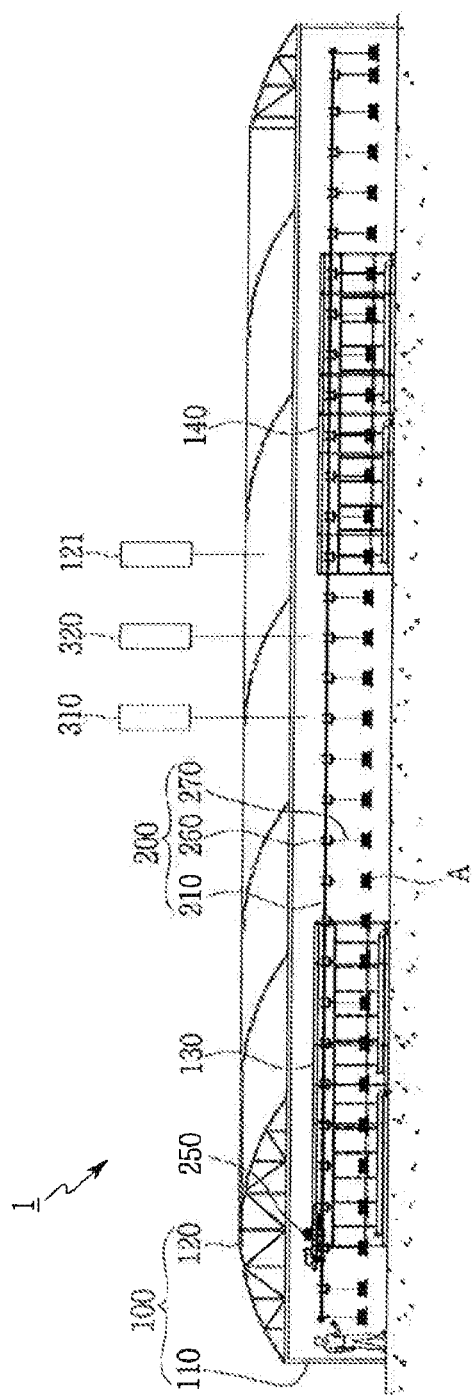
FIG. 1 is a cut-away side view of an embodiment for a plant factory, showing a trolley conveyor system inside the plant factory in which hangers are suspended from a trolley conveyor to support containers in which plants are grown, for movement between locations in the plant factory, as described herein.

The foregoing figures, being merely exemplary, contain various elements that may be present or omitted from a particular final configuration for an embodiment of a trolley system for plant cultivation factory. Other variations in trolley system components, and in the supply of workstations for particular needs of plants, such as watering, nutrient supply, pollination, pest control, and disease prevention, may include other mechanical structures, mechanical arrangements, or size and shape of components, and yet employ the principles described herein and as generally depicted in the drawing figures provided, and as more specifically called out in the claims set forth below. Detailed descriptions of configurations and functions of devices known by those of skill in the art are unnecessary, and have thus been omitted. However, there is no intention to limit the claimed invention to dimensional data, and any suggestion provided by any of the drawing figures of this specification are exemplary rather than mandatory. Thus, the chain assembly and related components for links in a trolley conveyor may be provided which is sized up or down from any dimensions depicted, without affecting the scope of the appended claims. An attempt has been made to draw the figures in a way that illustrates at least those elements that are significant for an understanding of exemplary trolley system for carriage of plant containers within a plant factory for efficient cultivation of plants, and particulars may be varied for specific plant production.

It should be understood that various features may be utilized in accord with the teachings hereof, as may be useful in different embodiments, depending upon the specific requirements such as spacing between passageways of runs of a trolley system, all within the scope and coverage of the teachings herein as defined by the claims. Further, like features in various embodiments for a trolley system for use in plant factories may be described using like reference numerals, or other like references, without further mention thereof.

DETAILED DESCRIPTION

Attention is directed to FIG. 1, where a plant cultivating system 1 in a plant factory 100 for cultivating plants is shown. In an embodiment, the plant factory 100 may be in the form of a conventional greenhouse, with windows on the ceiling and at the walls. Or, the plant factory 100 may be configured so that the light received by plants is totally controlled. In any event, the plant factory 100 may include a building structure having an outer wall 110 and a roof 120, and having an interior footprint determined by the size and shape of the building structure. In an embodiment, the roof 120 may be provided with automatic opening and closing mechanism 121 as noted in FIG. 1. As a result, sunlight and wind may flow into the plant factory 100 via windows 113 and the openings in the roof 120. The roof opening/closing mechanism 121 may be automatically operated by the control unit 300.

Figure 6:
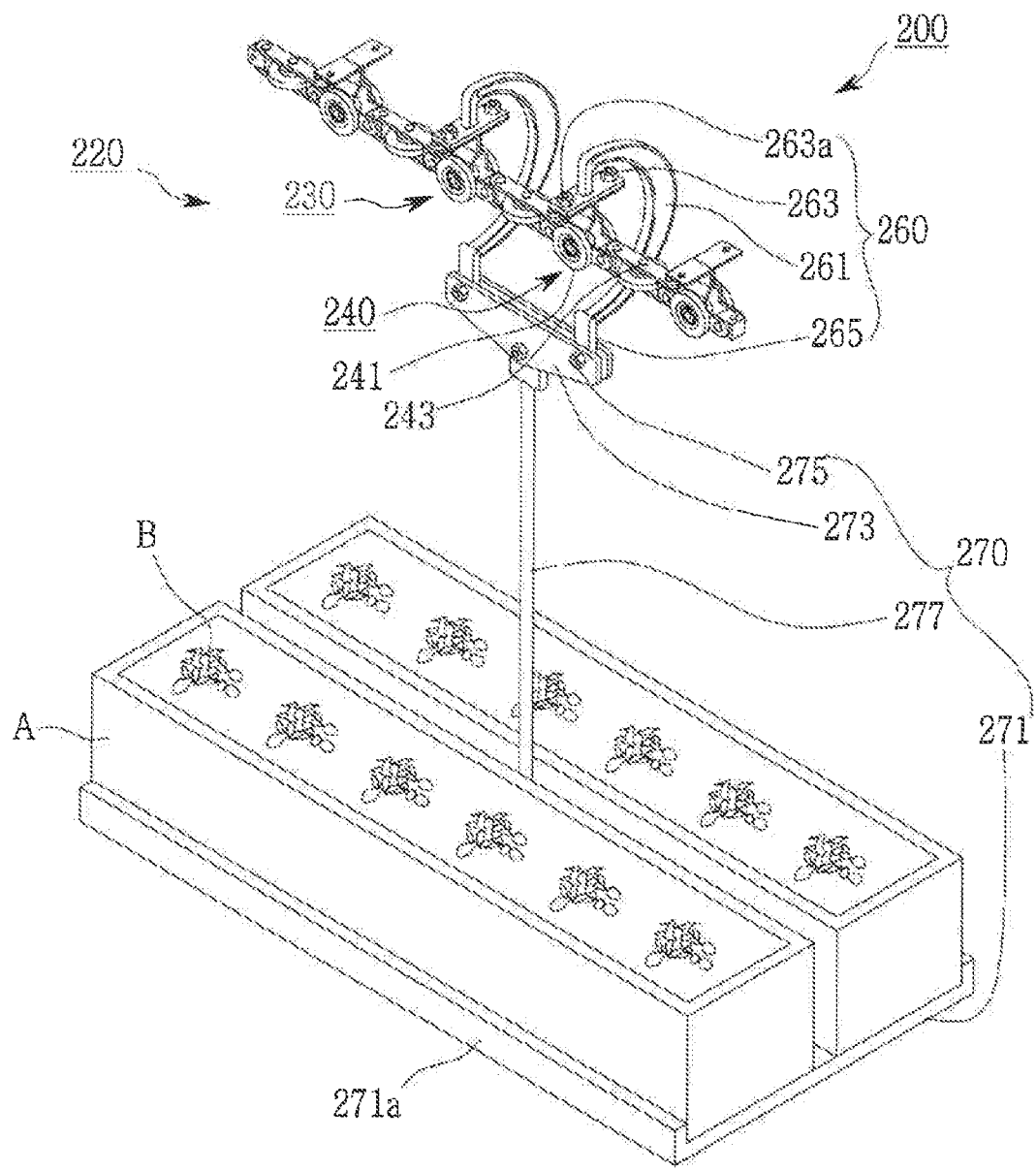
FIG. 6 is a perspective view, showing an embodiment for a section for a trolley conveyor suitable for movement on a track (not shown), now showing hangers which are suspended from the trolley conveyor assembly, and which support plant containers in which plants grow.

In an embodiment, the plant cultivation factory 100 may be provided in the form of a greenhouse for efficient lighting. The outer wall may include a door 111 through which workers L may enter, and windows 113 through which sunlight enters. Accordingly, plants B in plant containers B can be moved to a location where sunlight enters from windows 113 and/or roof 120, so that all of the plants B can be cultivated while receiving the same amount of sunlight. A plurality of plant containers A (see FIG. 6) which may be pots (or other configurations) may be provided. As shown in FIG. 6, the plant containers A are movably supported from trolley conveyor 200. A control unit 300 (see FIG. 2) is provided for controlling a chain drive 250 mechanism of the trolley conveyor 200. Temperature and humidity within the plant factory 100 may be controlled for various zones inside the plant factory 100, and the chain drive 250 moves plants B in plant containers A to locations according to desired environmental conditions, so that all plants B in plant containers A can be cultivated with the same quality under the same growing conditions.

Figure 2:
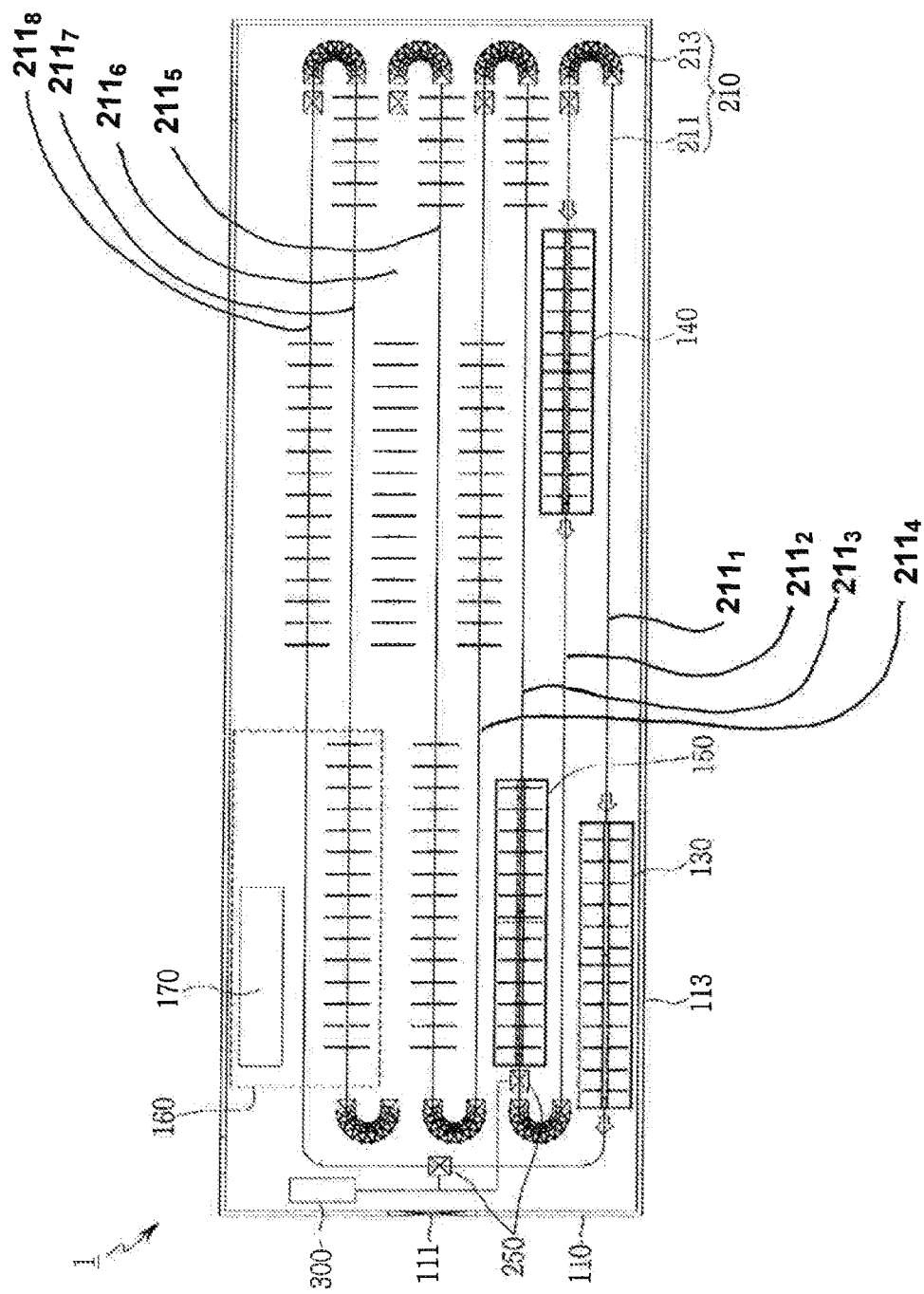
FIG. 2 is a plan view of the interior of a plant as just shown in FIG. 1, showing an embodiment for the layout of a trolley conveyor for circulation about the plant factory of plants in containers suspended from the trolley conveyor by hangers, as described herein.

The trolley conveyor 200 may be configured as a track portion 210 formed in a serpentine closed loop shape, as better seen in FIG. 2. The straight runs of track 210 of the trolley conveyor 200 are spaced closely together with space only provided for passage of plant containers A in a side-by-side fashion, as no room for workers L is necessary. A chain portion 220 is provided, which is movable along the track 210. A plurality of hangers 260 are coupled to the chain portion 220 at regular intervals, for movement along the track portion 210, as pushed or pulled along via the chain portion 220. As seen in FIG. 6, the hangers 260 may include a plant container A support portion 270. The plant container A support portion 270 may further include a plant container support plate 271. A plant container support plate 271 may be attached via connection shaft 277 connecting the plant container support plate 271 and the hanger coupling bracket 273 of each of the plurality of hangers 260, on which plant containers A are seated. As may be further appreciated from FIG. 6, a plant support footprint may be defined by the area below the plant container support portions 271a.

Figure 3:
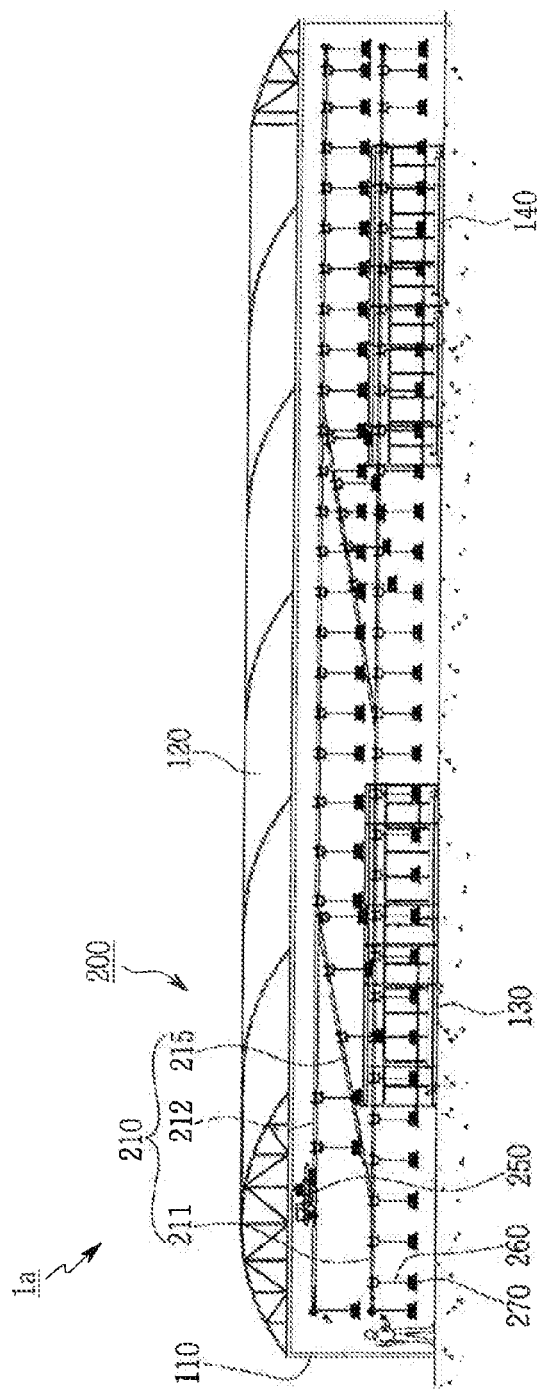
FIG. 3 is a cut-away side view of an embodiment for a plant factory, similar to the view first provided in FIG. 1, but now additionally showing multiple elevations of track operation for a trolley conveyor system inside the plant factory in which hangers are suspended from a trolley conveyor to support containers in which plants are grown, for movement between locations in the plant factory, as described herein.

As seen in FIGS. 2 and 3, in an embodiment, the track 210 may include a horizontal track portion 211 formed in parallel. As seen in FIG. 2, the track unit 210 may include a curved track portion 213 connecting the adjacent tracks, such as parallel adjacent track portions $211_1$, $211_2$, $211_3$, $211_4$, $211_5$, $211_6$, $211_7$, and $211_8$, as seen in FIG. 2. As seen in FIG. 3, the track unit 210 may also include an inclined track 215 connecting the horizontal track portions 211. In any event, the chain portion 220 may be provided, for circulation and movement along track unit 210.

In an embodiment, the plant factory 100 for plant cultivation may include a water supply section 130, a nutrient solution supply section 140, and a pollination section 150. In various embodiments, the track portion 210 may be configured to pass through the water supply section 130 and/or through the nutrient solution supply section 140, and/or through the pollination section 150.

Figure 8:
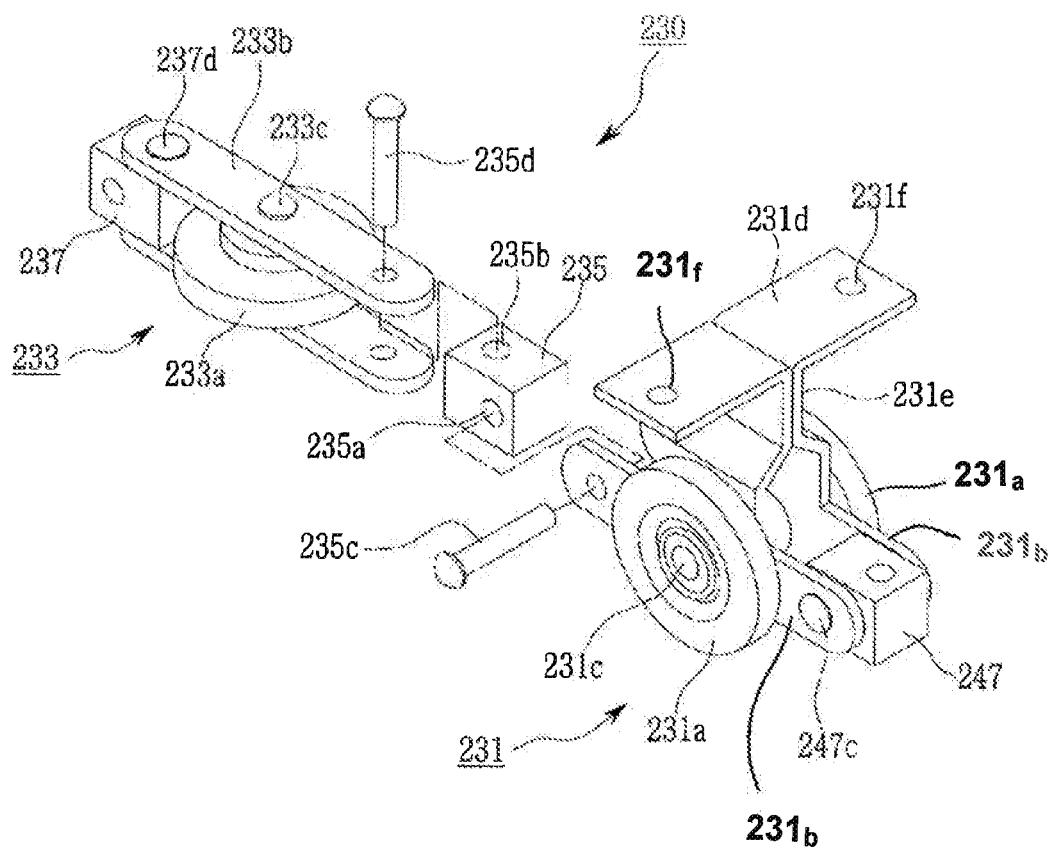
FIG. 8 is an exploded perspective view of disassembled components of an embodiment for the key movable components of the trolley conveyor, showing a first chain unit part with a substantially horizontal wheel in the chain link, and a second chain unit part with substantially vertically support wheels of the second chain unit part, where the vertical support wheels support the weight of the moveable trolley conveyor, including the first and second chain units, links, the hangers, and the plant containers with plants therein, as shown in FIG. 7.

In an embodiment, the chain portion 220 may be formed by a continuous, endless flexible chain structure, wherein a plurality of first chain units 230 and second chain units 240 are coupled each to the other. The plurality of first chain units 230 and second chain units 240 are located within the stationary portions of the track 210. A vertical roller support portion 231 is provided oriented in a direction to support a vertical rollers 231a, which rotate while contacting a bottom surface 211y of the track portion 210. A horizontal roller support portion 233 is provided within the stationary portions of the track portions 210 in a horizontal direction to support a horizontal roller 233a that is rotated while contacting inner sidewalls 211x of the track portion 210. An intermediate connection block 235 as shown in FIG. 8 is provided between the vertical roller support portion 231 and the horizontal roller support portion 233, to support the vertical roller support portion 231 and the horizontal roller support portion 233 to enable them to rotate in the vertical direction and the horizontal direction, respectively. The first chain unit 230 is formed by combining a first vertical roller support portion 231 and a first horizontal roller support portion 233 by a first intermediate connection block 235 as shown in FIG. 8. In an embodiment, a chain driving unit 250 may be provided to drive the chain portion 220, as directed by a control signal from the control unit 300.

In an embodiment, the plant factory 100 for cultivation of plants B (see FIGS. 6 and 14) may be provided with a packaging section 160 for separating flowers, fruits, or leaves from the plant and then placing the harvested plants or plant portions in packaging D for shipment. The track portion 210 is configured to pass through the packaging section 160, so that plants B on hangers are brought to workers L in packaging section 160.

In an embodiment, a water supply section 130 (see FIG. 2) may be provided. As suggested in FIG. 12, the water supply section 130 may be formed in a tunnel shape to surround plants B on the plant support 271 as the chain portion 220 of the trolley moves plants B through the water supply section 130. Water W may be provided by water supply pipe 131, which may be located below the track portion 210. Branch water pipes 133 may be provided from water supply pipe 131, and the branch water pipes 133 may be located in both sides of the water supply section 130. In an embodiment, the branch water pipes 133 may be vertically disposed along inner walls 130w of the water supply section 130. Water supply nozzles 135 may be provided to supply water W to the plants B in plant containers A which are moving through the water supply section 130.

In an embodiment, an aqueous nutrient supply station 140 may be provided (see FIG. 2), using substantially the same equipment and components as just described for the water supply section 130, as will be understood by those of ordinary skill in the art without need for additional details.

In an embodiment, a pollination section 150 may also be provided, the pollination section 150 may also be provided in a tunnel shape to surround plants B on a plant support 271 as chain portion 220 of the trolley conveyor 210 moves though the pollination section 150. Air C may be provided by water supply pipe 131, which may be located below the track portion 210. Branch water pipes 133 may be provided from air supply pipe 151, and the branch air supply pipes 153 may be located in both sides of the pollination section 150. In an embodiment, the branch air supply pipes 153 may be vertically disposed along inner walls 150w of the pollination section 150. Air supply nozzles 155 may be provided to supply air C to the plants B in plant containers A which are moving through the pollination section 150.

The plant cultivation system used in plant factory 100 is configured to move a plant container A to various locations in the plant factory 100, without the need for manual labor to reposition the plant container A. As shown in FIG. 2, a trolley conveyor 200 can move the plan container A along a selected path, such as a serpentine path as shown in FIG. 2, throughout the interior of the plant factory 100. Thus, plants may be cultivated easily by controlling water, nutrients, and light which are received by plants B in plant containers A. Accordingly, a worker L in the plant factory can move the plants B to his or her location in the plant factory 100, and does not need to move about the plant factory to move plants needing light or water or nutrients. Plants B in plant containers A are circulated throughout the inside of the plant factory by movement of the chain portion 220 of the trolley conveyor 200. By using such a trolley conveyor 200, all of the plants B in plant containers A can be moved as necessary to receive light, such as sunlight, in an even manner. In addition, since there is no need for a space for workers to move round within the plant factory 100, the interior of the plant factory 100 may be filled with plants B in plant containers, hanging from a chain portion 220 of the trolley conveyor 200, thereby maximizing space efficiency.

In addition, since the water supply process, the nutrient supply process, and pollination/fertilization processes are automatically performed during specific time periods via programmed movement of the chain unit 220, the growth of plants B can proceed without the necessity of input of the labor of worker L. And, since the plants B in plant containers A circulate inside the plant factory by movement of the chain portion 220 in this process, another advantage is that all of the plants B in plant containers A can be cultivated with uniform quality. Additionally, since the worker L waits in place at a designated workstation area, such as area a picking and packaging station 160 for plants B to arrive as moved by chain unit 220, the working time and labor required for harvest and packaging can be significantly reduced.

In addition, in the plant cultivation system used in the plant factory 100 as described herein, when the hangers 260 are is moved along by the chain portion 220 of the trolley conveyor 200, the horizontal rollers 233a and the vertical rollers 231a of the chain portion 220 contact the bottom surface 211y and sides 211x of the track portions 210 to provide movement which is eccentric to the track portions 210. As a result, noise and foreign substances are not generated when the chain portion 220 is moved, and thus transport of plants B is efficient.

Further, in an embodiment, a collection container 280 is detachably coupled to the container coupling hole 211b in the track portions 210, to collect lubricant or foreign matter which may be over supplied or otherwise escape from the chain portion 220. Accordingly, it is possible to prevent the lubricating oil or foreign substances from falling into the plant container A and contaminating plants B.

In an embodiment, the plant factory 100 using the plant cultivation system 1 as described herein may be divided into a water supply section 130, a nutrient solution supply section 140, a fertilization section 150, and a packaging section 160. The water supply section 130 is a section that supplies water W to the plants B in plant containers A, which are supported by the trolley conveyor 200. The nutrient solution supply section 140 supplies a nutrient solution containing nutrients to the plants B in plant containers A. The pollination or fertilization section 150 is a section allowing air C to be automatically directed at plants, to facilitate transfer of pollen, which in an embodiment, may be transfer of pollen between adjacent plants. The packaging section 160 is provided as a workstation for workers L to pick and/or pack plants, such as picking and packaging fruits or vegetables, or leaves of plants. In an embodiment, plants may be removed from plant containers A and shipped, or shipped in plant containers A, after packaging.

In an embodiment, the water supply section 130, the nutrient solution supply section 140, the fertilization section 150 and the packaging section 160 of the plant factory 100 are all interconnected by an endless trolley conveyor 200. Thus, the plant containers A are selectively moved to each section of the plant factory 100 while suspended from hangers 260 of the trolley conveyor 200. The drawing figures are illustrative, and not restrictive, and thus it should be understood that the water supply section 130, the nutrient solution supply section 140, the fertilization/pollination section 150, and the packaging section 160 may be arranged in various ways within a plant factory 100 using the plant cultivation system 1 described herein.

A trolley conveyor 200 allows the plant containers A to move inside the plant factory 100 while hanging in the air. The trolley conveyor 200 includes a track 210, which may be provided at or near the ceiling of the plant factory 100. A chain portion 220 is provided to be movable inside the track 210. The chain portion may be provided as continuously linked chain portion 220. The change portion includes a hanger portion 260 which is coupled at spaced apart intervals to the chain portion 220. A support portion 270 is coupled to the lower portion of the hanger portion 260, such as at bracket coupling plate 265, to support plant containers A. The track 210 may be provided at or near the top of the plant factory 100 to form a path through which the chain portion 220 is circulated and moved. In an embodiment, the track 210 may include a straight length of track 211 which may be parallel to and formed along the longitudinal direction of the plant factory 100, and a curved length of track 213 which connects adjacent ends of straight lengths of the track 211, as seen in FIG. 2. Accordingly, in an embodiment, the track 210 as a whole may form a serpentine shaped closed loop path.

As shown in FIG. 3, when the plant factory 100 is provided with multiple stories, e.g. a building with multiple floors, or where tracks are utilized at different heights in a building, the track 210 further includes a two-layer track, i.e. a lower track 211, and an upper track 212. Additionally, and inclined track 215 may be provided to connect the tracks 211 and 212. In an embodiment, the first-floor straight track 211, the curved track 213, and the second-floor track 212 may all be provided in the form of an endless, continuing chain portion 220. Accordingly, in an embodiment the chain portion 220 may be moved from the first floor to the second floor through the inclined track 215, and may be likewise moved from the second floor to the first floor, with continuous circulation of chain portion 220.

Figure 7:
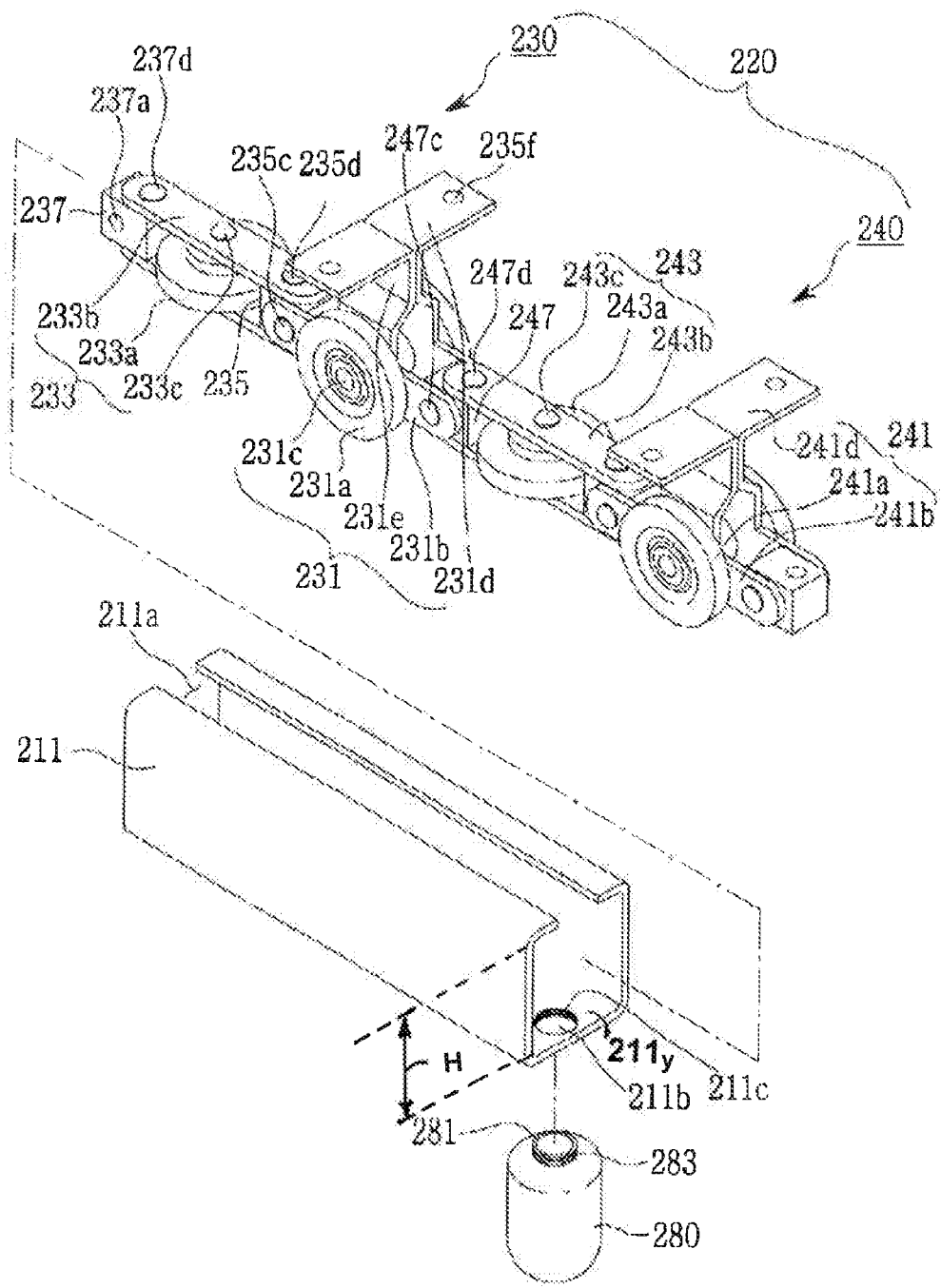
FIG. 7 is a partially disassembled perspective view, and showing the components involved in combining a stationary slotted tubular track for the trolley conveyor with the movable portion of the trolley conveyor, for use in a plant cultivation system in a plant factory, as described herein.

Since the configurations of the straight, normally horizontal track 211, the curved track 213, and the inclined track 215 are basically the same, only the construction of the normally horizontal track 211 will be described in detail. The horizontal track 211 may be formed in the shape of a square tube, pipe, or slotted strut, with a slot or opening 211a formed therein, as shown in FIG. 7. The slot or opening 211a forms a path through which the neck 231e of the chain portion 220 moves.

In various embodiments, container coupling holes 211b are formed on the bottom surface 211y of the track 211 at regular intervals. Details are seen in FIGS. 8, 9, 10, and 11. The collection container 280 is detachably coupled to the track 211 at container coupling hole 211b. The container coupling hole 211b and the collection container 280 are screwed together. To this end, a first screw thread 211c is formed on the inner wall surface of the container coupling hole 211b, and a second screw thread 283 is formed on the outer wall surface of the coupling pipe 281 above the collection container 280, as seen in FIG. 7. The collection container 280 collects foreign substances generated when the chain portion 220 is moved along the track 210, as well as any excess lubricating oil supplied for smooth movement of the chain portion 220. Thus, foreign substances and lubricants are moved from the inside of the track 211 to the bottom surface 211y, and are collected in a collection container 280 coupled to the bottom surface 211y. In this way, foreign substances and lubricants are directed away from the plants B in the plant containers A, thus substantially blocking or eliminating contamination of the plants B. Regular maintenance of collection container 280 can remove the foreign substances and lubricants from collection container 280, such as when the container is filled with foreign substances and lubricants. In various embodiments, it should be possible for operator to remove the collection container 280 from the track 211, clean the collection container 280, and then reinstall the collection container 280 in the track 210.

Figure 9:
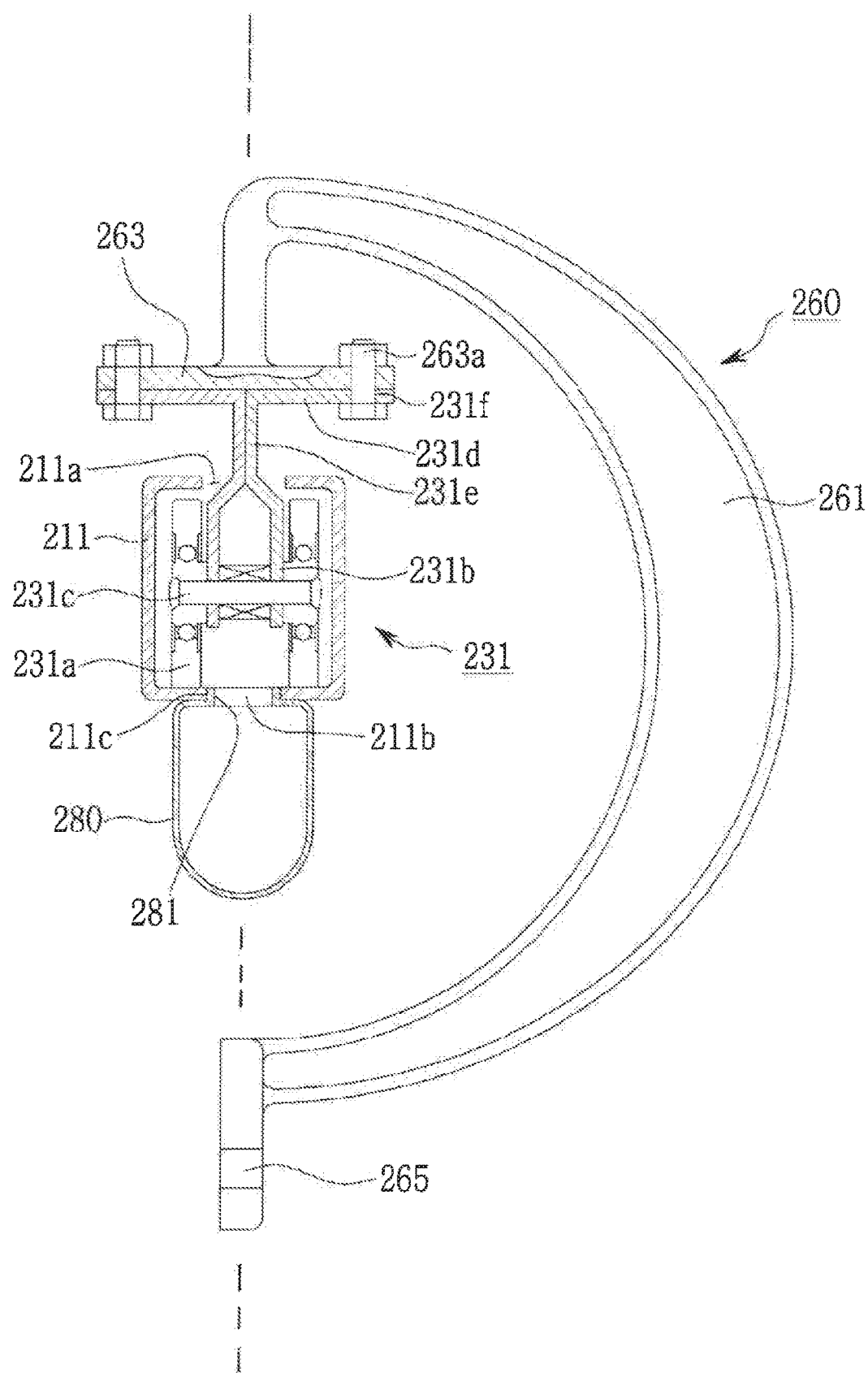
FIG. 9 is a partial cross-sectional view, showing the connection of a hanger with movable components of the trolley conveyor, and showing in cross-section some of the movable components of the trolley conveyor, specifically including the substantially vertical wheels within a stationary slotted tubular track configured to support the trolley conveyor and the hangers, as well as components moveably supported by the hangers and moveable portions of the trolley conveyor as described herein.
Figure 11:
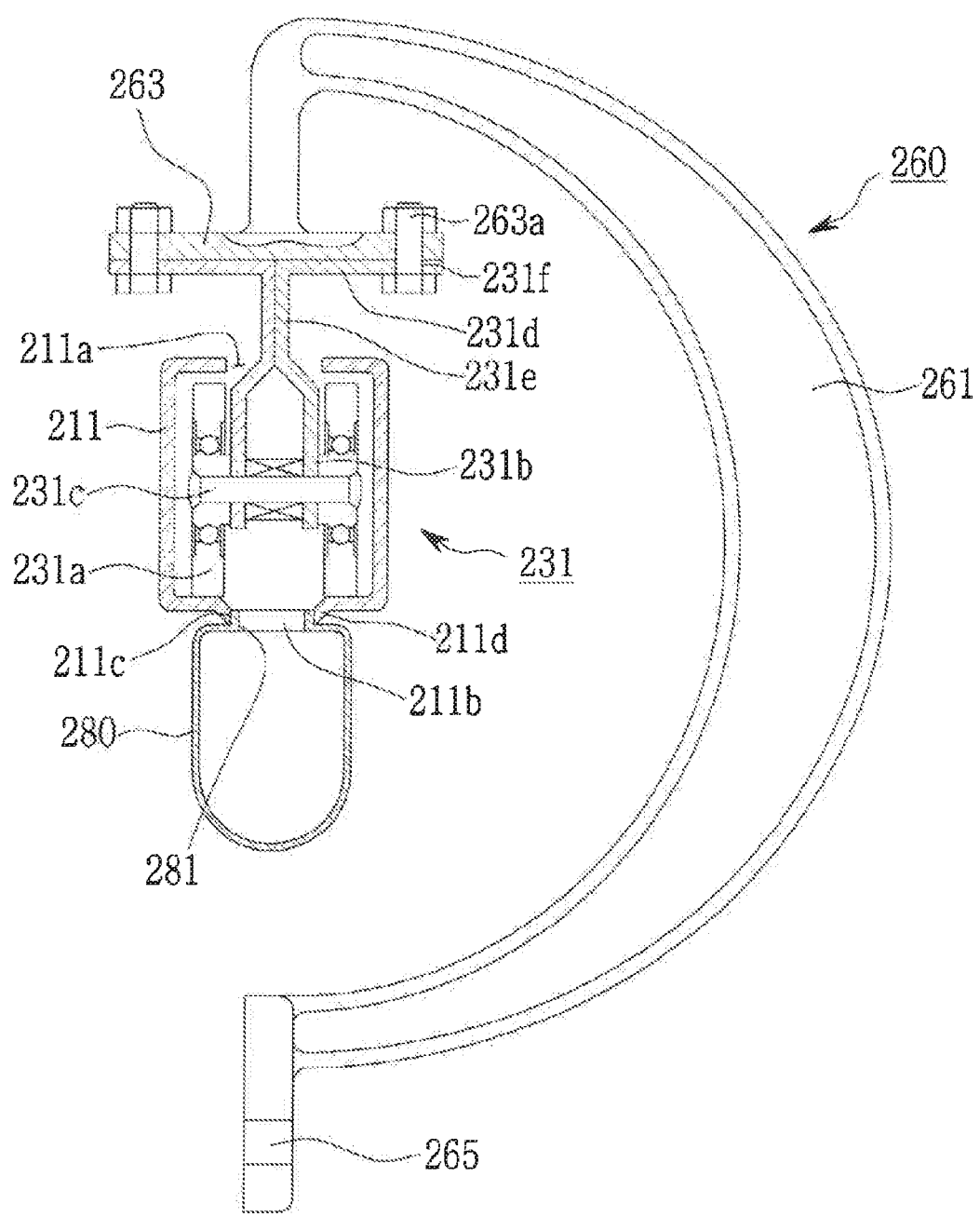
FIG. 11 is a partial cross-sectional view, similar to the view shown in FIG. 9 above, showing the connection of a hanger with movable components of the trolley conveyor, and showing in cross-section some of the movable components of the trolley conveyor, specifically including the substantially vertical wheels within a stationary slotted tubular track configured to support the trolley conveyor and the hangers, as well as components moveably supported by the hangers and moveable portions of the trolley conveyor as described herein, but now additionally showing the downwardly inclined bottom walls which slope toward a container coupling hole, which allows foreign matter or lubricant to be more easily collected, and thus prevent contamination of plants.

Attention is directed to FIG. 11, and comparison to FIG. 9 is invited. As shown in FIG. 11, an inclined surface 211d is provided, inclined downward toward the container coupling hole 211b on the bottom surface 211y of the track 211. With this structure, foreign substances or lubricants can be more easily discharged from the track 211 to the collection container 280, due to the presence of the inclined surface 211d.

Figure 5:
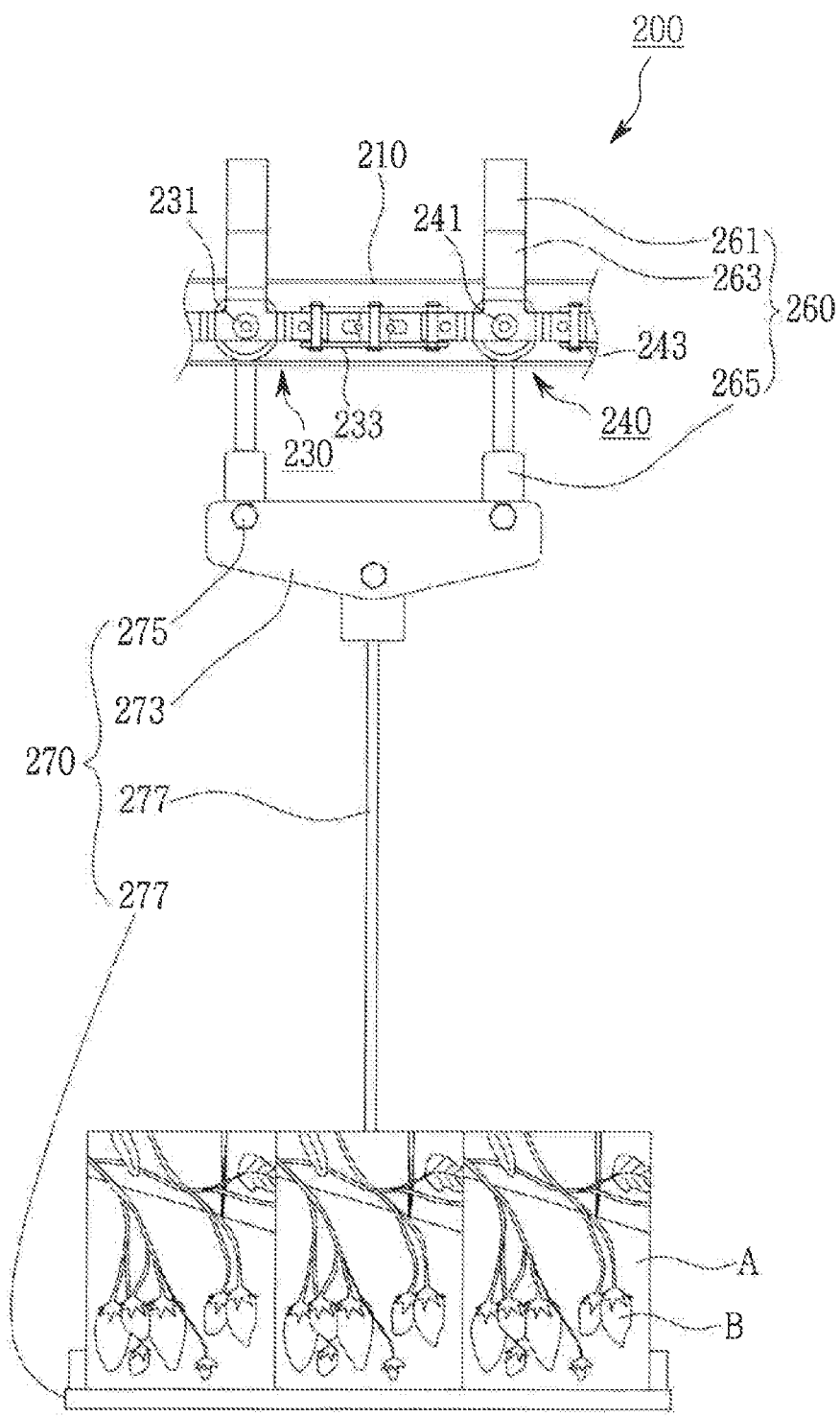
FIG. 5 is a front view, showing an embodiment for a configuration where the trolley conveyor of the plant cultivation system supports plant containers such as pots, in which plants are grown.

In various embodiments, the straight portions (e.g. track portions $211_1$ through $211_8$ in FIG. 2) of track 211 are located side by side in a plurality of rows along the longitudinal direction inside the plant factory 100. With such a layout, plants B can be automatically moved even if a worker L is not in the plant factory 100 to move the plant. It is not necessary to provide a separate movement path for the worker L, since plants arrive at workstation 160 for all work which requires worker L. Accordingly, the straight track portions of track 211 can be formed adjacent to each other at intervals corresponding to the width of the plant containers A, and in such a manner the entire interior of the plant factory 100 may be filled with plant containers A, so that the plant container A per unit cultivation area in the plant factory 100 is maximized. This plant factory 100 design has the advantage of maximizing the number of plant containers A, and plants B therein, and thus, maximizing efficiency of space utilization The chain portion 220 moves along the track 210 and allows the hanger 260, on which the plant container A is suspended, to move around the inside of the plant factory 100. FIGS. 5 and 6 are a front view and a perspective view, respectively, showing a how the trolley conveyor 200 supports the plant container A. As shown, the chain portion 220 is formed by continuously coupling first chain units 230 and second chain units 240 to each other. Since the repeated first chain units 230 and the repeated second chain units 240 have the same basic configuration, as can be appreciated from FIG. 7, only the first unit chain 230 will be described in detail.

FIG. 7 is an exploded perspective view showing a structure in which a first chain unit 230 and a second chain unit 240 are combined for use within a straight section of track 211. FIG. 8 is an exploded perspective view of the first chain unit 230, showing how various components are combined. The first chain unit 230 is formed by combining a first vertical roller support part 231 and a first horizontal roller support part 233 by a first intermediate connection block 235 as shown in FIG. 8. The first vertical roller support part 231 includes a pair of first vertical rollers 231a disposed for vertical placement inside the track 210. A first vertical roller rotation shaft 231c is provided for rotatably supporting a pair of first vertical rollers 231a via a pair of first vertical roller support frames 231b. A first hanger coupling flange 231d is provided with a predetermined area in the horizontal direction above the pair of first vertical roller support frames 231b. The first hanger coupling flange 231d includes a first neck 231e connecting the first hanger coupling flange 231d to the first vertical roller support frames 231b.

As seen in FIG. 9, a pair of first vertical rollers 231a are disposed in a vertical direction inside the track 211, to rotate and move along the bottom surface 211y of the track 211. The outer diameter of the first vertical roller 231a is formed to be slightly smaller than the inside height H of the track 211 (see FIG. 7) and is provided for rolling motion along the inside of the track 211. The first vertical roller rotation shaft 231c passes through the pair of first vertical roller support frames 231b and are coupled to the center of the pair of first vertical rollers 231a. The first vertical roller rotation shaft 231c supports a pair of first vertical rollers 231a to enable rotation. To this end, a bearing (not shown) may be provided between the first vertical roller 231a and the first vertical roller rotation shaft 231c. The first vertical roller rotation shaft 231c is provided to have a length less than the corresponding to the width of the track 211, as can be appreciated in FIGS. 9 and 11, so that the first vertical rollers 231a are disposed symmetrically in both directions inside the track 211.

In an embodiment, the first neck 231e may be formed in the center direction from the top of the pair of first vertical roller support frames 231b, and extend upward through the opening 211a of the track 211. The first neck 231e is formed smaller than the opening 211a so that it can be smoothly and easily moved linearly along the opening 211a. The first hanger coupling flange 231d is formed to extend a predetermined area horizontally on the upper portion of the first neck 231e, and is coupled to the flange coupling plate 263 of the hanger portion 260. First fastening holes 231f are formed on both sides of the first hanger coupling flange 231d, and hanger 260 is coupled thereto by the flange coupling plate 263 and the first fastening member 263a, as seen in FIG. 9.

Figure 10:
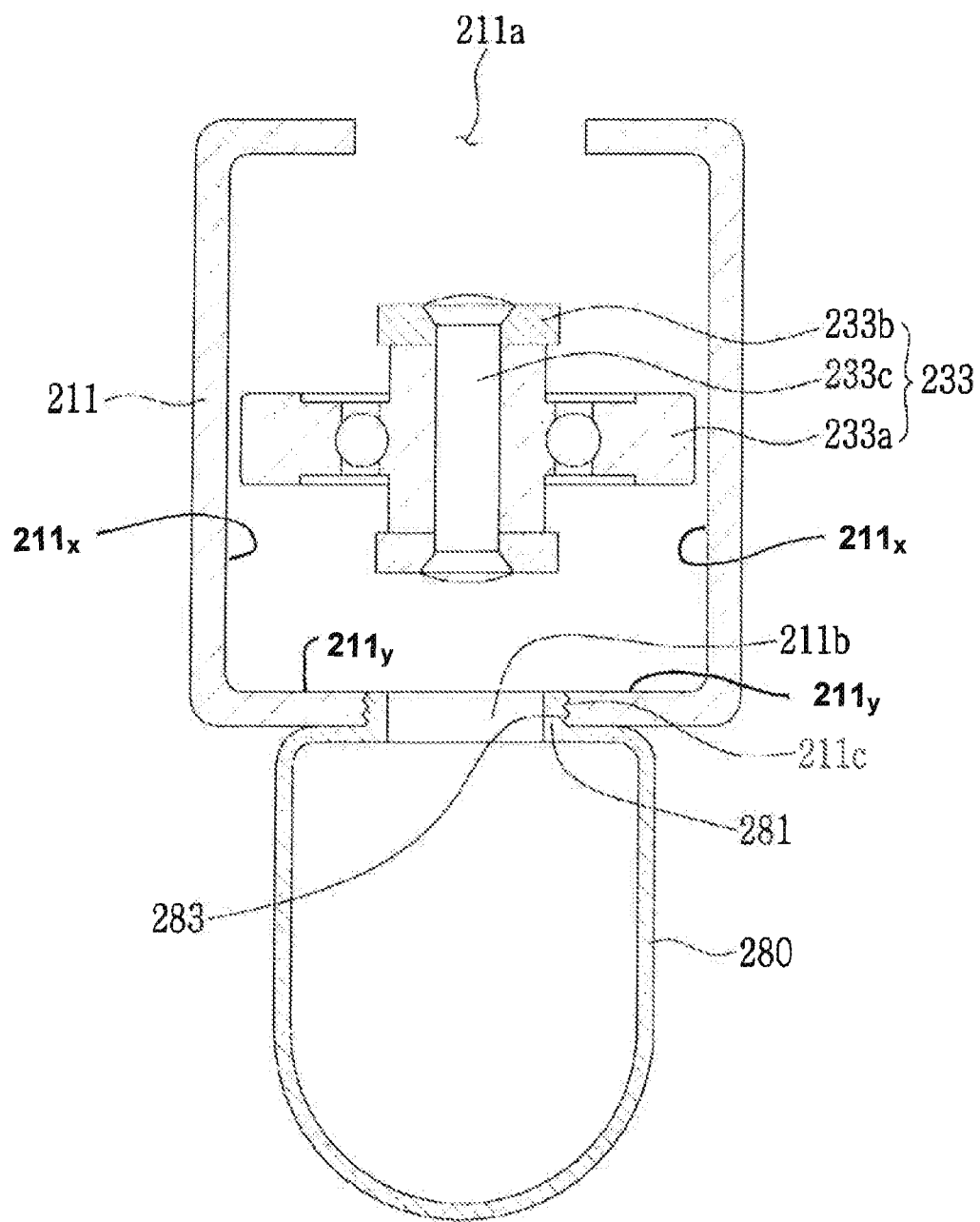
FIG. 10 is a partial cross-sectional view, showing the connection of certain movable components of the trolley conveyor, namely showing in cross-section the substantially horizontal wheels within a stationary slotted tubular track as configured to guide the trolley conveyor within the stationary slotted tubular track.

As also seen in FIG. 8, the first horizontal roller support part 233 includes a first horizontal roller 233a, a pair of first horizontal roller support frames 233b which support the first horizontal roller 233a from above and below. And, a first horizontal roller rotation shaft 233c rotatably supports the first horizontal roller 233a with respect to the first horizontal roller support frame 233b. As shown in FIG. 10, the first horizontal roller 233a is positioned in the horizontal direction in track 211. The first horizontal roller 233a has an outer diameter corresponding to a predetermined amount less than the width of the track 211, as can be appreciated from FIG. 10.

The first chain unit 230 may be provided in a form in which the first vertical roller support 231 and the first horizontal roller support 233 are combined, as shown in FIGS. 9 and 10. In an embodiment, the combination provided in this manner because the hanger part 260 is coupled to support portion 270 in an eccentric configuration. When the hanger body 261 is eccentrically disposed on one side of the track 210 in a "C" shape as seen in FIG. 9, the plant container A is loaded on the container support 270 provided under the hanger 260. In this manner, the load on hangar 260 becomes eccentric to one side. However, when the hanger body 261 is eccentric in this way, the chain portion 220 may be inclined to one side inside the track 210 and may not move smoothly. In order to solve this problem, the chain portion 220 may be provided in a configuration where a continuous chain in which vertical rollers 231a and horizontal rollers 233a are alternately arranged. The hanger 260 is eccentrically coupled to one side of the track 210, but a pair of vertical rollers 231a and 241a and horizontal rollers 233a and 243a are arranged in the vertical and horizontal directions of the track 210. By moving the chain portion 220 while the vertical rollers 231a and 241a and horizontal rollers 233a and 243a are in contact with the inner wall surface walls 211x and 211y (or similar interior walls of track 210, or 213, or 215), the chain portion 220 moves inside the track 210 without being eccentric, and maintaining a balanced load. Accordingly, as shown in FIG. 9, the first neck 231a of the vertical roller support portions 231 and 241 can move without touching the edge forming the opening 211a of the track 210.

As shown in FIG. 9, a pair of first vertical rollers 231a is disposed on both sides inside the track 211, and the first vertical rollers 231a contact the bottom surface 211y of the track 211. The pair of first vertical rollers 231a move along the bottom surface 211y of the horizontal track 211 and support the vertical load. When the first horizontal roller 233a is moved along the inside of the track 211, it is rotated by contacting inner wall surfaces of track 211. Since the chain portion 220 is not eccentric, it can be moved in a balanced fashion.

The first vertical roller support portion 231 and the first horizontal roller support portion 233 are coupled by an intermediate connection block 235. As shown in FIG. 8, the intermediate connection block 235 is coupled between a pair of first vertical roller support frames 231b and a pair of first horizontal roller support frames 233b. The intermediate connection block 235 may be provided in the form of a rectangular or parallelepiped block. In the intermediate connection block 235, a first intermediate horizontal connection shaft insertion hole 235a is formed through in a horizontal direction, and a first intermediate vertical connection shaft insertion hole 235b is formed through a vertical direction. The first intermediate horizontal connection shaft 235c is inserted through the pair of first vertical roller support frames 231b, disposed on the left and right, and into the first intermediate horizontal connection shaft insertion hole 235a. The first intermediate vertical connection shaft 235d is inserted into the first intermediate vertical connection shaft insertion hole 235b through a pair of first horizontal roller support frames 233b arranged vertically.

As shown in FIG. 7 by the connection structure of the intermediate connection block 235, the first vertical roller support part 231 and the first horizontal roller support part 233 may be moved along the track part 210 in a coupled state. In this case, the first vertical roller support part 231 and the first horizontal roller support part 233 may be rotated vertically around the first intermediate horizontal connection shaft 235c, and the first intermediate vertical connection shaft 235d can be rotated left and right. In this manner the chain portion 220 can be smoothly moved not only a straight, horizontal portion of track 211, but also a the curved track portion 213. Finally, a first end connection block 237 may be provided at a front end of the first horizontal roller support part 233. The first end connection block 237 is used to connect to another chain unit, similar to chain unit 230, located in front of the first chain unit 230 shown in FIG. 8. Overall, as shown in FIGS. 7 and 8, the chain portion 220 may be formed by continuously coupling chains units 230 and 240 to each other. Each of the chain units 230 and 240 are coupled so that vertical roller support portions 231 and 241 and horizontal roller support portions 233 and 243 can be rotated vertically and horizontally by an intermediate connection block 235. And, the neighboring chain units 230 and 240 are coupled to be able to rotate up and down and left and right by the front end connection blocks 237 and 247.

More particularly, as shown in FIG. 7, the first unit chain 230 and the second unit chain 240 are coupled by a second end connection block 247. The second end connection block 247 is provided between the first vertical roller support frame 231b of the first unit chain 230 and the second horizontal roller support frame 243b of the second unit chain 240. The first vertical roller support frame 231b is operatively coupled to be rotatable up and down by a second end connection block 247 and a second end horizontal connection shaft 247c, and the second horizontal roller support frame 243b has a second end. The connection block 247 and the second end vertical connection shaft 247d are coupled to enable left and right rotation. Thus, the chains units 230 and 240 are disposed adjacent to each other and are coupled to each other so as to be able to rotate up and down and left and right by the front connection blocks 237 and 247. As a result, the chain portion 220 to which repeated chain units 230 and 240 are continuously coupled can smoothly move through portions of the track 210 of various shapes, such as straight portions 211, curved portions 213, or inclined portions 215. The horizontal rollers 233a and vertical rollers 231s are alternately provided in each of the chain units 230 and 240, and are in contact with the bottom surface 211y and the inner side surface 211y of the track unit 210 and can be moved in balance without being eccentric. As a result, the first neck 231e does not come into contact with the edge of the opening 211a of the horizontal track 211 and the chain portion 220 can be moved so that noise and foreign matter are not generated when the chain part 220 moves.

The chain portion 220 is driven by the chain drive mechanism 250. A plurality of chain drive mechanisms 250 may be provided along the track 210 at regular intervals along the track 210 to enable smooth movement of the chain portions 220. In an embodiment, the chain driving mechanism 250 may include an electric motor and a drive unit that transmits energy from the motor to the chain portion 220. In an embodiment, the chain drive mechanism 250 may be controlled by a control signal from the control unit 300.

In an embodiment, the hanger part 260 may be fixedly coupled to the chain portion 220 and moved together with the chain portion 220. In an embodiment, one of the hangers 260 may be coupled to the first chain portion 230 and the other is coupled to the second chain portion 240, as can be appreciated from FIG. 7. A pair of hangers 260 is thus coupled to adjacent chain portions, and support portions 270 are affixed to each hanger 260. In this way, the load of the plant container A loaded on the plant container support unit 270 is distributed and supported on the pair of hangers 260, so that the transport of the plant containers A via the chain portion 220 can proceed stably and smoothly.

The hanger 260 is provided with a flange coupling plate 263 at the top of the hanger body 261, and is bent in a "C" or "c" shape The flange coupling plate 263 is coupled to the hanger coupling flange 231d in chain units 230. A flange coupling plate 263 is disposed in contact with the flange 241d of chain unit 240. A bracket coupling plate 265 is provided at the lower end of the hanger body 261 and coupled to the hanger coupling bracket 273 of the plant container support portion 270.

The hanger body 261 is disposed on one side of the chain portion 220. The hanger body 261 is formed to extend from the side of the track 210 to the upper center and the lower center along centerline $C_L$ as shown in FIG. 9. The flange coupling plate 263 is formed in an area corresponding to the hanger coupling flanges 231d and 241d of each of chain units 230 and 240, and disposed to be stacked on the hanger coupling flanges 231d and 241d. The bracket coupling plate 265 is disposed vertically under the hanger body 261 and is inserted between the pair of hanger coupling brackets 273 of the plant container B support portion 270. The bracket coupling plate 265 and the pair of hanger coupling brackets 273 are coupled by a second fastening member 275. The plant container support portion 270 is provided under the hanger 260 and holds the plant container A. The plant container support portion 270 is fixedly coupled to the hanger 260 and supports the plant containers A as they are moved in a suspended state by the movement of the chain portion 220.

The plant container support portion 270 may be attached to hangars 260 by a pair of hanger coupling brackets 273 which are coupled with the bracket coupling plate 265 of the hanger 260 as shown in FIGS. 5 and 6. A connection shaft 277 connects the plant support plate 271 and the hanger coupling bracket 273. The hanger coupling bracket 273 may be provided in a pair, and the bracket coupling plates 265 may be inserted between the pair of hanger coupling brackets 273. The hanger coupling brackets 273 are provided in a plate shape having a length corresponding to the interval between the pair of hangers 260. The pair of bracket coupling plates 265 may be coupled to the hanger coupling brackets 273 second fastening members 275. The plant support plate 271 is provided having an area in which the plant container A can be seated. A support wall 271a may be provided, bent upward, at an edge region of the plant support plate 271.

Figure 12:
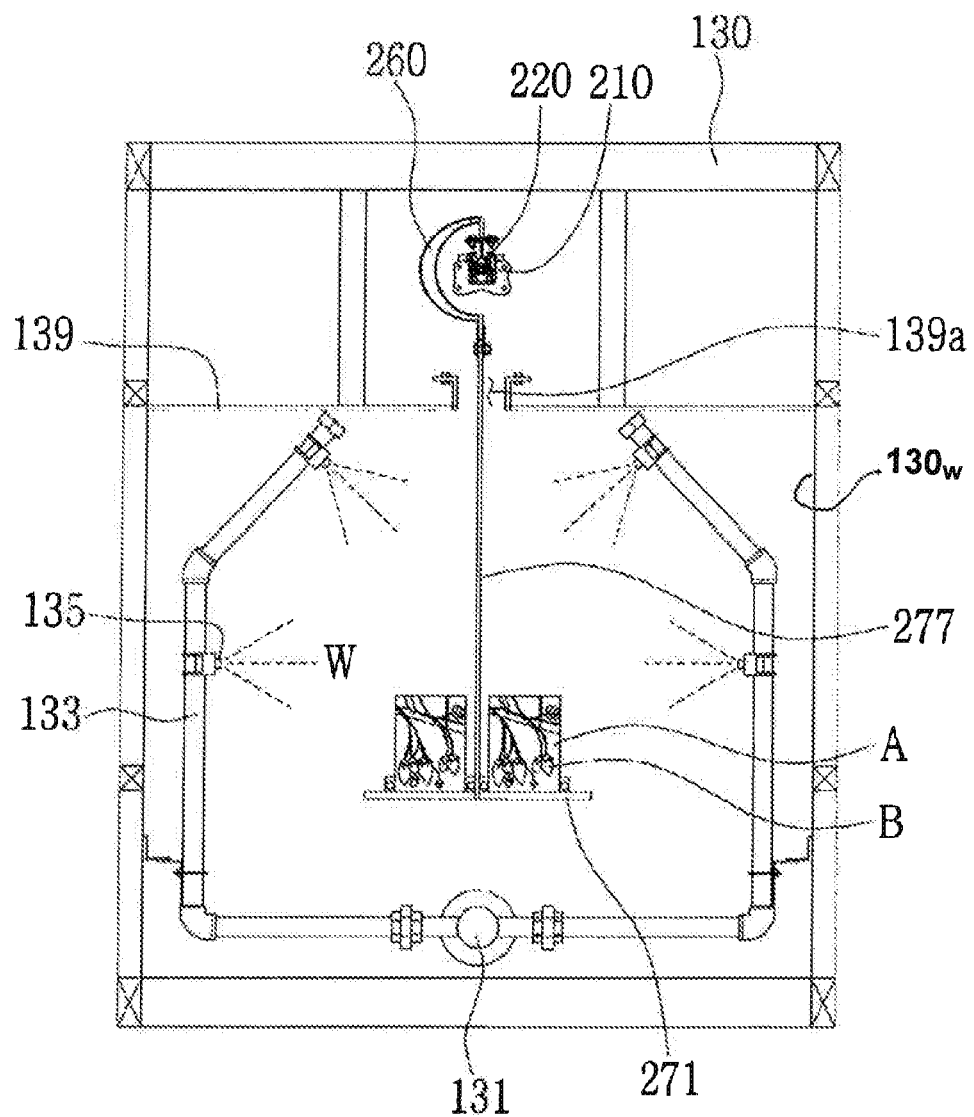
FIG. 12 is an elevation view of the equipment provided in a water supply section of the plant factory, showing how a hanger suspended from the trolley conveyor supports plant containers with plants therein, while passing through a tunnel passageway in which water is supplied to a plurality of spray nozzles supplied with water from a water supply via pipes, wherein the spray nozzles provide water the plurality of plants being cultivated in the plant factory; this configuration is also utilized for supply of nutrients dissolved in water.

FIG. 12 provides an exemplary view showing a process of moving the plants B in plant containers A through the water supply section 130 of the plant cultivation plant 100, using trolley conveyor 200. As shown, the water supply section 130 is provided in a closed tunnel shape. A trolley conveyor 200 is provided at the top of the water supply section 130 so that the hanger 260 moves along with the chain portion 220 and moves the plant container A having plants B therein through the water supply section 130. A water supply pipe 131 is provided at the bottom of the water supply section 130. The water supply pipe 131 is connected to a water storage tank or water supply and receives water, which may be supplied by a water supply pump 137. Water branch pipes 133 are provided, extending to both sides at regular intervals along a longitudinal direction of the water supply pipe 131. Note in FIG. 2 how the water supply section 130 extends longitudinally along a length of track $211_1$. In this manner, the water branch pipes 133 are provided to surround the inside of both sides of the tunnel forming the water supply section 130 as shown, and a plurality of water supply nozzles 135 are provided to supply water W in a spray to plants B. The water supply nozzles 135 are provided at a position and angles at which water can be supplied to the plant containers A which are suspended in the air. Consequently, the plant containers A move through the water supply section 130 while loaded on plant container support 270 of the hanger 260, to receive water. An upper protection plate 139 is provided in the water supply section 130 so as to partition between the upper portion of the water branch pipe 133 and the track 210. In the water supply section 130, the upper protection plate 139 may be provided to block the water sprayed from the water supply nozzles 135 from reaching the track 210.

A nutrient solution supply section 140 may be disposed in the plant factory 100, and spaced apart from the water supply section 130. The nutrient solution supply section 140 is provided in the same structure as the water supply section 130, with only the difference being that the nutrient solution supply section 140 provides nutrient solution, rather than water. See FIG. 2 showing an exemplary layout for the nutrient solution supply section 140.

Figure 13:
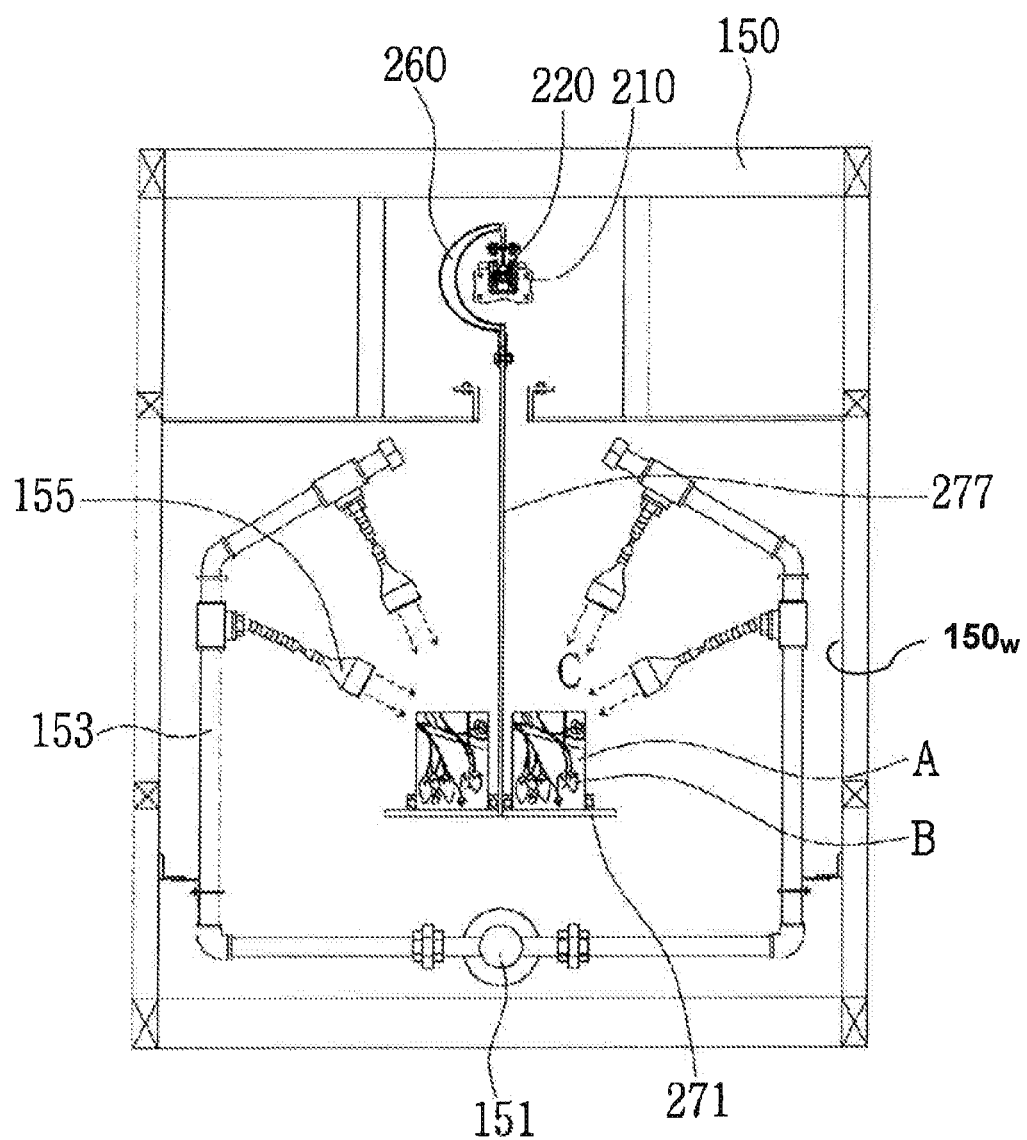
FIG. 13 is an elevation view of the equipment provided in a fertilization section of the plant factory, showing how a hanger suspended from the trolley conveyor supports plant containers with plants therein, while passing through a tunnel passageway in which pollen of flowers in plant containers is moved by supply of air injected by a plurality of spray nozzles toward the plant containers supported by hangers, so that natural fertilization occurs as pollen of flowers is transferred between plants in containers.

FIG. 13 is an exemplary view showing the process of moving the plant containers A using the trolley conveyor 200 in the fertilization/pollination section 150 of the plant cultivation factory 100. The fertilization/pollination section 150 is configured to be spaced apart from the water supply section 130 and from the nutrient solution supply section 140, as can be appreciated by reference to FIG. 2. In the fertilization section 150, air is forcibly supplied to the plant containers A with plants B therein, so that the pollen of flowers planted in the plant containers A is blown by the air so that natural fertilization occurs. The fertilization section 150 is formed in a tunnel shape having a predetermined length inside the plant factory 100. In the fertilization section 150, an air supply pipe 151 is formed at the bottom along the longitudinal direction, again as may be appreciated by reference to FIG. 2. The air supply pipe 151 is connected to an air supply pump 157 to supply external air. A plurality of air branch pipes 153 are provided in the air supply pipe 151 at regular intervals along a longitudinal direction, and air supply nozzles 155 are provided in the air branch pipe 153. The air supply nozzles 155 are disposed at a position and angle at which air can be supplied toward the plant containers A. Thus, when the fertilization time arrives, pollen moves to the flowering plants in plant containers A by the air supplied by moving each of the plant containers A through the fertilization section 150 as shown in FIG. 13, so that the fertilization occurs naturally.

Figure 14:
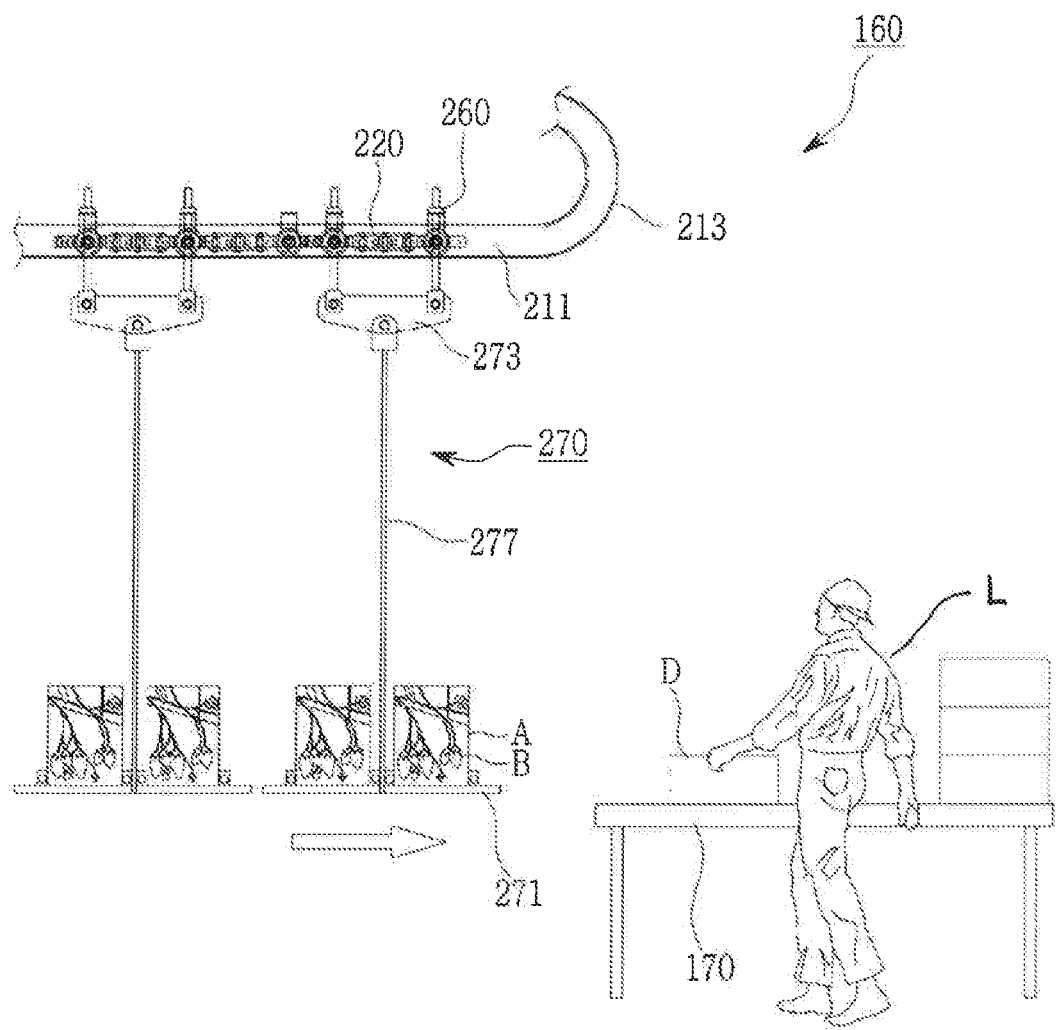
FIG. 14 is an elevation view showing proximity between a workstation and a trolley system, and illustrates a process for packing plants, showing how plants in containers are brought to a single location for handling.

FIG. 14 is an exemplary view showing the configuration of the packaging section 160 of the plant cultivation factory 100. As shown in FIGS. 2 and 14, a work table 170 may be disposed in the packaging section 160 of the plant cultivation factory 100. On the work table 170, a packaging box D is provided for packaging plants in the plant containers A, as may be useful in the sale of plants B, or in the sale of portions thereof. A trolley conveyor 200 may be provided adjacent to, or above the packaging section 160. When a worker L stands adjacent to, or under the trolley conveyor 200, the chain portion 220 moves, and a plurality of hangers 260 coupled to the chain portion 220 sequentially moves plant containers A toward the worker L. Accordingly, the worker L only needs to separate and package the plants or fruits from the plant containers A arriving at the packing section 160. The worker L does not have to go around the inside of the plant factory 100 directly. This is highly cost effective, since one advantage is that the use of the plant cultivation system 1 described herein, and packaging section 160 as described, can significantly reduce overtime.

Figure 4:
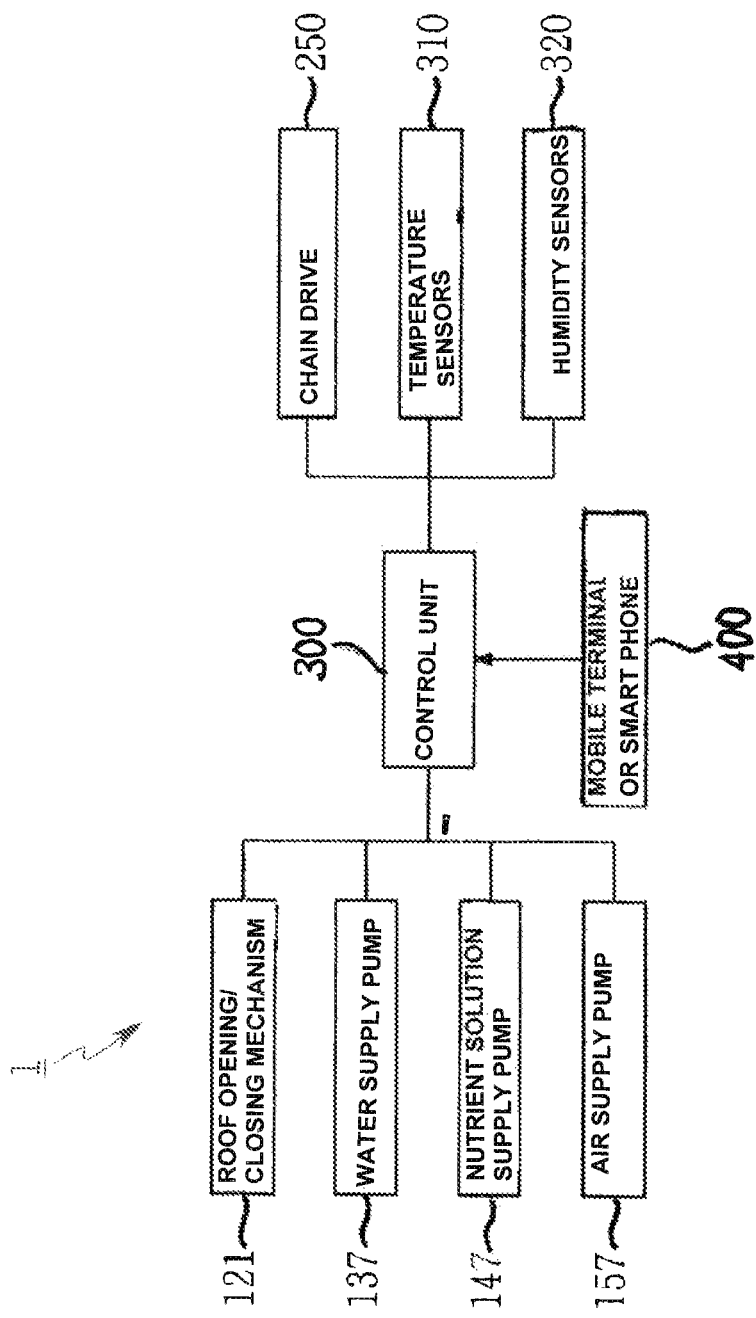
FIG. 4 provides a block diagram which describes embodiments for a plant cultivation system described herein, and also providing mention of the internal configuration for an embodiment of a cultivation system for plants in a plant factory.

The control unit 300 drives the trolley conveyor 200 according to programmed instructions, which can be adjusted for parameters such as the external weather conditions, and the amount of sunlight available, and the temperature and humidity inside the plant factory 100. The plant cultivation system can regulate the growth environment of all the plants B in plant containers A, to make growing conditions equivalent for plants B in the factory. FIG. 4 is a block diagram schematically showing the control flow of the controller 300. The plant cultivation factory 100 is provided with a temperature sensor 310 and a humidity sensor 320, respectively. The temperature sensor 310 is provided inside and outside the plant factory 100, respectively, and transmits the internal temperature and the external temperature to the control unit 300. In addition, temperature sensors 310 may be disposed in different areas inside the plant cultivation factory 100 to transmit the temperature of each area to the control unit 300. The inside of the plant cultivation factory 100 may have different temperatures between a window side to which sunlight enters and a shade side to which sunlight does not enter. The temperature sensors 310 of each region transmits the temperature of the region to the controller 300.

The humidity sensor 320 measures the humidity inside the plant factory 100 and transmits it to the control unit 300. The control unit 300 directs control of the chain drive mechanism 250 when the temperature difference between the positive and the shade is large based on the temperature inside the plant factory 100 that is being transmitted from the plurality of temperature sensors 310. Locations of plant containers A may thus be switched as appropriate. In addition, the control unit 300 may drive the roof opening/closing mechanism 121 based on the external temperature transmitted from the temperature sensors 310 to allow sunlight and wind to flow into the plant factory 100.

The control unit 300 may be driven by manually receiving an input signal through an input unit (not shown) or by receiving an input signal manually through a mobile terminal 400 of a worker such as a smartphone. The control unit 300 may adjusts the speed of the chain portion 220 to a low speed so that the plants B in plant containers A, moving while being suspended in the air, do not have adverse effects from vibration or stress due to movement. The control unit 300 drives the chain drive mechanism 250 and the water supply pump 137 when the input signal is manually applied from the operator or the humidity sensed by the humidity sensor 320 is low. When the humidity is low, the chain portion 220 can move plant containers A to the water supply section 130 to receive water. In addition, the control unit 300 drives the chain drive mechanism 250 and a nutrient solution supply pump 147 according to a received input signal, so that the plant containers A may be moved along by chain portion 220 to the nutrient solution supply section 140. In addition, the control unit 300 drives the chain drive mechanism 250 and the air supply pump 157 so that the plant containers A are moved to the fertilization section 150 by the chain portion 220, to receive air C and natural convection, if windows or the roof are open. Consequently, the plant containers A located near the window 113 and receiving a relatively large amount of sunlight are moved to the inside or the shade side of the plant factory 100, and the plant containers A located inside or on the shade side are moved closer to windows 113. Likewise, in the case of a multilayer structure as shown in FIG. 3, the plant containers A on the second floor may be moved to the first floor, and the plant containers A on the first floor may be moved to the second floor. In this way, the chain portion 220 is driven so that all the plant containers A inside the plant factory 100 circulate and move, while supported in the air by hangers 260 and plant supports 271, so that the growing environment of all the plant containers A is the same. As a result, the quality of flowers, fruits, or leaves formed in the plant containers A can be the same.

When the growth of the plants B in the plant containers A is completed, harvesting may be completed as shown in FIG. 14. A worker L in the packaging section 160 receives plants B in plant containers A, as they are moved to a location at or adjacent a working table 170. The worker L separates the fruit or flower or leaf from the plant B in plant container A, while on the plant support 270 that has been moved to or adjacent the work table 170. The worker L packs the separated flower, fruit or leaf in a packaging box D. Since the worker L is only required to be at the packaging station, and the plant containers A move to the working table 170, the movement required for packaging is minimized and work efficiency can be improved.

In an embodiment, the plant cultivation system 1 as described above, may utilize work table inside the plant factory 100. However, in some cases, the worktable 170 and the packaging section 160 for unloading plants B or parts thereof for shipment may be provided outside the plant factory 100, i.e. in a separate space outside of the building. In that embodiment, the chain portion 220 may be provided so that it can be selectively connected to the working area outside of the plant factory 100. Also, in an embodiment, a separate work area such as packaging section 160 may be provided where an air conditioner is operated to cool the space, thereby increasing the work efficiency of the worker L.

Although only a few exemplary embodiments have been described in detail, various details are sufficiently set forth in the drawings and in the specification provided herein to enable one of ordinary skill in the art to make and use the invention(s), which need not be further described by additional writing in this detailed description. It will be readily apparent to those skilled in the art that the plant cultivation system 1, and the plant factory 100 details as described herein, may be modified from those embodiments provided herein, without materially departing from the novel teachings and advantages provided.

The aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive. As such, this disclosure is intended to cover the structures described herein and not only structural equivalents thereof, but also equivalent structures. Numerous modifications and variations are possible in light of the above teachings. It is therefore to be understood that within the scope of the appended claims, the invention(s) may be practiced otherwise than as specifically described herein. Thus, the scope of the invention(s), as set forth in the appended claims, and as indicated by the drawing and by the foregoing description, is intended to include variations from the embodiments provided which are nevertheless described by the broad interpretation and range properly afforded to the plain meaning of the claims set forth below.

The invention claimed is:

1. A plant cultivation system, comprising:
    a building structure, the building structure having an interior footprint defined by size and shape;
    a trolley conveyor, the trolley conveyor comprising:
        a track, the track supported at least in part within the building structure, the track comprising a tubular member with inner sidewalls and an upper slot, the track laid out along a plurality of straight sections connected by curved sections laid out at least in part in a serpentine pattern,
        a chain, the chain comprising a plurality of first chain portions each having a pair of vertical wheels and at least one horizontal wheel, and a plurality of second chain portions each having at least one vertical wheel, wherein the plurality of first chain portions and the plurality of second chain portions are provided forming the chain, which is an endless flexible chain for movement within the track, the first and second chain portions each further comprising a neck extending upward through the upper slot of the track, and a hanger coupling flange extending horizontally outward from each neck,
        a plurality of hangers, the hangers affixed to the hanger coupling flanges of the first chain portions or second chain portions, the hangers having plant support portions configured to support a plurality of plant containers for growing plants therein, an area below the plant support portions comprising a plant support footprint,
        a chain drive mechanism configured for moving the chain,
        a control unit, the control unit programmed to direct the chain drive mechanism to move the chain in response to input from environmental sensors, the sensors configured to monitor environmental conditions in the building structure, and
    wherein the track is laid out so that the plant support portions on adjacent straight sections of track are closely adjacent so that insufficient space is provided for passage of human workers between plant support portions on adjacent straight sections of the track.

2. The plant cultivation system as set forth in claim 1, further comprising a packaging station in at least one location in or adjacent to the building structure, the packaging station comprising a worktable for a worker to receive plants in plant containers and pack plants or parts thereof for shipment; and
    wherein the track of the trolley conveyor is located adjacent or above the packaging station.

3. The plant cultivation system as set forth in claim 2, wherein the system comprises separating flowers, fruits, or leaves from plants in plant containers.

4. The plant cultivation system as set forth in claim 1, wherein the track has a bottom portion having a plurality of apertures therein, and wherein the track further comprises a plurality of containers, each of the containers detachably coupled with an aperture in the bottom of the track.

5. The plant cultivation system as set forth in claim 4, wherein the system further comprises collection of oil or debris in the plurality of containers, wherein oil or debris is substantially prevented from reaching plants in the plant containers.

6. The plant cultivation system as set forth in claim 5, wherein the bottom portion of the track adjacent an aperture in the plurality of apertures further comprises a downwardly sloping wall, and wherein oil or debris is urged by gravity toward a container in the plurality of containers.

7. The plant cultivation system as set forth in claim 1, wherein the track further comprises an inclined portion, and wherein the plurality of straight sections of the track are provided at a first level and at a second level, and where the second level is higher than the first level, and wherein the chain moves along the inclined portion of the track between the first level and the second level.

8. The plant cultivation system as set forth in claim 1, wherein the plant cultivation system further comprises a water supply section, and wherein the water supply section is provided as a tunnel like structure surrounding at least one of the plurality of straight sections of the track, and wherein the system is configured to move the plurality of plant containers suspended by the plurality of hangers from the chain through the water supply section to water plants in the plurality of plant containers.

9. The plant cultivation system as set forth in claim 8, wherein the tunnel like structure of the water supply section is formed along at least one of the plurality of straight sections of the track, and wherein a water supply pipe is provided under a length of track, wherein the water supply section has inner sidewalls, and the water supply pipe has branch water pipes adjacent the inner sidewalls of the tunnel like structure, and further comprising a plurality of water supply nozzles, the water supply nozzles configured to supply water to plants in the plurality of plant containers as they are moved through the tunnel like structure by the chain of the trolley conveyor.

10. The plant cultivation system as set forth in claim 1, wherein the plant cultivation system further comprises a nutrient solution supply section, and wherein the nutrient solution supply section is provided as a tunnel like structure surrounding at least one of the plurality of straight sections of the track, and wherein the system is configured to move the plurality of plant containers suspended by the plurality of hangers from the chain through the nutrient solution supply section to provide nutrient solution to plants in the plurality of plant containers.

11. The plant cultivation system as set forth in claim 10, wherein the tunnel like structure of the nutrient solution supply section is formed along at least one of the plurality of straight sections of the track, and wherein a nutrient solution supply pipe is provided under length of track, the nutrient solution supply section having inner sidewalls, and the nutrient solution supply pipe having branch nutrient solution supply pipes adjacent the inner sidewalls of the tunnel like structure, and further comprising a plurality of nutrient solution supply nozzles, the nutrient solution supply nozzles configured to supply nutrient solution to plants in the plurality of plant containers as they are moved through the tunnel like structure by the chain of the trolley conveyor.

12. The plant cultivation system as set forth in claim 1, wherein the plant cultivation system further comprises a fertilization section, and wherein the fertilization section is provided as a tunnel like structure surrounding at least one of the plurality of straight sections of the track, and wherein the system is configured to move the plurality of plant containers suspended by the plurality of hangers from the chain through the fertilization section, to supply air in order to enable movement of pollen between plants in the plurality of plant containers.

13. The plant cultivation system as set forth in claim 12, wherein the tunnel like structure of the fertilization section is formed along at least one of the plurality of straight sections of the track, and wherein an air supply pipe is provided under a length of track in the fertilization section, the fertilization section having inner sidewalls, and the air supply pipe having branch air supply pipes adjacent the inner sidewalls of the tunnel like structure, and further comprising a plurality of air supply nozzles, the air supply nozzles configured to supply air to plants in in the plurality of plant containers as they are moved through the tunnel like structure by the chain of the trolley conveyor, so that pollen is moved between plants in plant containers.

14. The plant cultivation system as set forth in claim 1, wherein the environmental sensors of the control unit comprise temperature sensors and humidity sensors.

15. The plant cultivation system as set, forth in claim 14, wherein the control unit is additionally programmed to direct the chain drive mechanism to move the chain in response to manual input.

16. The plant cultivation system as set forth in claim 1, wherein the plant cultivation system further comprises an openable roof, and wherein the control unit is configured to open and close the roof in response to signals from the environmental sensors.

17. The plant cultivation system as set forth in claim 16, wherein the control unit is additionally programmed to direct the chain drive mechanism to move the chain in response to manual input.

18. The plant cultivation system as set forth in claim 1, wherein the plant cultivation system further comprises openable windows, and wherein the control unit is configured to open and close windows in response to signals from the environmental sensors.

19. The plant cultivation system as set forth in claim 18, wherein the control unit is additionally programmed to direct the chain drive mechanism to move the chain in response to manual input.

* * * * *